US011238110B2

(12) United States Patent
Greetham

(10) Patent No.: US 11,238,110 B2
(45) Date of Patent: Feb. 1, 2022

(54) USING A SINGLE-ENTRY ACCESS POINT TO ARCHIVE DATA IN AND OUT OF AN ELECTRONIC DOCUMENTS REVIEW AND REPORTING SYSTEM

(71) Applicant: David Greetham, Houston, TX (US)

(72) Inventor: David Greetham, Houston, TX (US)

(73) Assignee: RICOH COMPANY, LTD., Tokyo (JP)

( * ) Notice: Subject to any disclaimer, the term of this patent is extended or adjusted under 35 U.S.C. 154(b) by 62 days.

(21) Appl. No.: 16/355,336

(22) Filed: Mar. 15, 2019

(65) Prior Publication Data

US 2020/0293578 A1 Sep. 17, 2020

(51) Int. Cl.
*G06F 16/93* (2019.01)
*G06F 16/11* (2019.01)
*G06F 16/26* (2019.01)
*G06Q 10/10* (2012.01)
*G06F 40/205* (2020.01)
G06F 3/0484 (2013.01)

(52) U.S. Cl.
CPC ............ *G06F 16/93* (2019.01); *G06F 16/113* (2019.01); *G06F 16/26* (2019.01); *G06F 40/205* (2020.01); *G06Q 10/10* (2013.01); *G06F 3/04842* (2013.01)

(58) Field of Classification Search
None
See application file for complete search history.

(56) References Cited

U.S. PATENT DOCUMENTS 5,940,843 A 8/1999 Zucknovich et al.
8,856,662 B2 10/2014 Becker

| 8,994,732 | B2 | 3/2015 | Lee |
| 10,459,939 | B1 | 10/2019 | Agnew |
| 2003/0193502 | A1 | 10/2003 | Patel |
| 2006/0037019 | A1 | 2/2006 | Austin |

(Continued)

OTHER PUBLICATIONS

Greetham, U.S. Appl. No. 16/355,291, filed Mar. 15, 2019, Office action, dated Aug. 5, 2020.

*Primary Examiner* — Kyle R Stork
(74) *Attorney, Agent, or Firm* — Hickman Becker Bingham Ledesma LLP; Malgorzata A. Kulczycka

(57) ABSTRACT

An approach is provided for using a single-entry access point to archive data in and out of an electronic document review and reporting system. In an embodiment, a method comprises receiving, by a data access system, a request for data and parsing the request to determine a request type of the request. Based on the request type, particular data is determined and accessed from either the data access system or a document review and reporting system. Based on the particular data, the data access system generates one or more of: particular review analysis data, particular reporting data, or particular specific data. The particular review analysis data includes one or more of: a review progress summary, a review analysis report, a review analysis summary, or a review analysis job report. The particular reporting data includes one or more of: a global trend report, a statistical report, or an executive summary. The particular specific data includes additional data for a particular data point included in the particular data. The particular data is transmitted to a client device to cause the client device to generate a graphical user interface.

20 Claims, 25 Drawing Sheets

(56) References Cited

U.S. PATENT DOCUMENTS

| | | | | |
|---|---|---|---|---|
| 2009/0077008 | A1 | 3/2009 | Francis | |
| 2009/0300544 | A1* | 12/2009 | Psenka | H04L 63/10 715/810 |
| 2010/0169137 | A1 | 7/2010 | Jastrebski | |
| 2011/0167066 | A1 | 7/2011 | Picault | |
| 2012/0215804 | A1 | 8/2012 | Christensen | |
| 2013/0132814 | A1 | 5/2013 | Mangini | |
| 2013/0185252 | A1 | 7/2013 | Palmucci | |
| 2014/0043337 | A1* | 2/2014 | Cardno | G06K 9/52 345/440 |
| 2014/0173501 | A1 | 6/2014 | Wu | |
| 2014/0280300 | A1* | 9/2014 | Ottenfelt | G06Q 10/0633 707/769 |
| 2014/0280630 | A1 | 9/2014 | Torgersrud | |
| 2014/0317147 | A1 | 10/2014 | Wu | |
| 2015/0170382 | A1 | 6/2015 | Bhatia | |
| 2015/0178366 | A1 | 6/2015 | Farahood | |
| 2015/0370467 | A1 | 12/2015 | Holmes-Higgin | |
| 2016/0307276 | A1* | 10/2016 | Young | G06Q 30/04 |
| 2016/0358101 | A1* | 12/2016 | Bowers | G06N 20/00 |
| 2016/0378748 | A1 | 12/2016 | Shoshan | |
| 2018/0089717 | A1* | 3/2018 | Morin | G06Q 30/0261 |
| 2019/0026848 | A1* | 1/2019 | Denker | G06F 40/171 |
| 2019/0164070 | A1* | 5/2019 | Gupta | G06F 9/46 |
| 2019/0324980 | A1 | 10/2019 | Yu | |
| 2019/0333256 | A1 | 10/2019 | Xu | |
| 2020/0089818 | A1 | 3/2020 | Redkina | |
| 2020/0293518 | A1 | 9/2020 | Greetham | |
| 2020/0293577 | A1 | 9/2020 | Greetham | |

\* cited by examiner

FIG. 4A

| |
|---|
| 402 Request for Data |
| 404 Specification of the Requested Data (Workspace, Users, Group of Users, Reviewers, Group of Reviewers, Matters, etc.) |

FIG. 4B

| |
|---|
| 406 Request for Review Analysis Data |
| 408 Specification of the Requested Review Analysis Data<br>• Progress [Review progress, Document review rate, Review ratio per reviewers, Total documents reviewed per reviewers, User document review rate, Reviewer documents reviewed hourly, Average native size review rate, Total native size reviewed ratio, Total text size Reviewed]<br>• Data [Hourly summary per reviewers including Rates, Text review rate, Native review rate, Total text reviewed, error counts]<br>• Report [Per reviewer including Counts of reviewed documents, Document review rate, Text review rate, Native review rate, Total Native summary]<br>• Sessions [Per matter identifier including environment identifiers, Session start and end times, Session Errors, Session length, User artifact identifier, User full name, User email address, Case artifact identifier]<br>• Jobs [Summary of currently running jobs] |

FIG. 4C

| 422 Request for Reporting Data |
|---|
| 424 Specification of the Requested Reporting Data<br><br>• Global trends<br>  [Select Environment, Select a start date, Select an end data]<br><br>    For Selected Environment and dates, provide file size trend, environment size trend, indexes size trend, database size trend, document growth trend, natives trend, image trend, production images trend, files growth trend, workspace growth trend...<br><br>• Statistics [Daily statistics, Monthly statistics, Top workspaces documents]<br><br>• Executive Summary<br><br>    [Line representations of Monthly total size of reviewed documents: Active, Archived, Deleted in the last 30 days, Deleted, Nearline, Testing]<br>    [Block representations of Monthly total size of reviewed documents: Active, Archived, Deleted in the last 30 days, Deleted, Nearline, Testing]<br>    [Monthly new cases]<br>    [Monthly new cases in GB size]<br>    [Monthly total users] |

| ⌀ PROGRESS | ⊟ DATA | ≔ REPORT | ⚙ SESSIONS | ⚒ JOBS |
|---|---|---|---|---|
| ▣ EXPORT TO EXCEL  ▣ EXPORT TO PDF ||||||
| Drag a column header and drop it here to group by that column |||||
| Hour | Name | Review Rate | Text Review Rate (KiB) |
| 10/3/2018 2:00 PM | Reviewer 001 | 8 | 84.44 |
| 10/3/2018 2:00 PM | Reviewer 002 | 1 | 6.98 |

| ⌀ PROGRESS | ⊟ DATA | ≔ REPORT | ⚙ SESSIONS | ⚒ JOBS |
|---|---|---|---|---|
| ⦿ Overall  ○ Date Range  3/2/2019  ▪ 3/9/2019 ▪ |||||
| ▣ EXPORT TO EXCEL  ▣ EXPORT TO PDF |||||
| Drag a column header and drop it here to group by that column |||||
| Name | Documents Rev... | Documents Rev... | Text Review Rate (KiB) |
| Reviewer 005 | 20302 | 118.03 | 27.25 |
| Reviewer 017 | 15087 | 102.63 | 26.43 |

| ⌀ PROGRESS | ⊟ DATA | ≔ REPORT | ⚙ SESSIONS | ⚒ JOBS |
|---|---|---|---|---|
| ▣ EXPORT TO EXCEL  ▣ EXPORT TO PDF |||||
| Drag a column header and drop it here to group by that column |||||
| ID | Instance | Session Start | Session End |
| 255886 | Environment 1 | 11/8/2018 9:50 PM | 11/8/2018 10:06 PM |
| 255877 | Environment 1 | 11/8/2018 9:27 PM | 11/8/2018 9:48 PM |
| 255874 | Environment 1 | 11/8/2018 9:14 PM | 11/8/2018 10:12 PM |

REPORTING Data

USING A SINGLE-ENTRY ACCESS POINT TO ARCHIVE DATA IN AND OUT OF AN ELECTRONIC DOCUMENTS REVIEW AND REPORTING SYSTEM

RELATED APPLICATIONS

This application is related to U.S. patent application Ser. No. 14/634,475 filed Feb. 27, 2015; U.S. patent application Ser. No. 14/634,490 filed Feb. 27, 2015 now U.S. Pat. No. 10,191,907, issued on Jan. 29, 2019; U.S. patent application Ser. No. 14/634,498 filed Feb. 27, 2015 now U.S. Pat. No. 9,633,030, issued on Apr. 25, 2017; U.S. patent application Ser. No. 12/726,553 filed Mar. 18, 2010, now U.S. Pat. No. 9,087,207, issued on Jul. 21, 2015; U.S. patent application Ser. No. 14/799,002 filed Jul. 14, 2015; U.S. patent application Ser. No. 15/812,878 filed Nov. 14, 2017; U.S. patent application Ser. No. 15/812,887 filed Nov. 14, 2017; U.S. patent application Ser. No. 16/259,558 filed Jan. 28, 2019; U.S. patent application Ser. No. 14/749,607 filed Jun. 24, 2015 now U.S. Pat. No. 9,852,112, issued on Dec. 26, 2017; U.S. patent application Ser. No. 14/749,609 filed Jun. 24, 2015 now U.S. Pat. No. 10,135,800, issued on Nov. 20, 2018; U.S. patent application Ser. No. 15/854,588 filed Dec. 26, 2017; and U.S. patent application Ser. No. 16/355,278 filed Mar. 15, 2019; and U.S. patent application Ser. No. 16/355,291 filed Mar. 15, 2019.

FIELD

Embodiments relate generally to an approach for providing electronic document retrieval, reviewing, and reporting.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted being prior art by inclusion in this section.

In today's digital world, massive amounts of electronic data are created and stored in digital data repositories every day. Reviewing huge amounts of data may be, however, time consuming and expensive, especially when the data is highly sensitive, and the review process is meticulous and accurate. This is particularly relevant in reviews of electronic-discovery ("e-Discovery") data. For example, if the data includes legal evidence documents, then the review process needs to be well managed to avoid oversights of the evidence or rendering the evidence inadmissible as the oversights and evidence inadmissibility could expose a party to a law suit to court-imposed sanctions.

With the enormous growth in e-Discovery trends and with the increase in the complexity of data reviewing systems, typical systems for reviewing electronic evidence appear to be difficult to use and very expensive. For example, they often fail to provide high quality results at the reasonable prices.

SUMMARY

An approach is provided for using a single-entry access point for client devices to archive, retrieve, review and report data stored in a document review and reporting system. Examples of the document review and reporting systems include a full-feature Relativity™ e-Discovery platform that has extensive and robust capabilities for storing, reviewing, sorting and searching data, but that, due to its complexity, may be difficult to navigate or use.

A data access system may be implemented in a computer-based system such as a cloud computer-based system or a main-frame system. Examples of the data access systems include an Acumen™ system developed by the Ricoh Corporation.

A data access system may be configured as an advanced proxy or an advanced portal configured to retrieve, from a document review and reporting system, data requested by a client device. The data access system may make a copy of the data retrieved from the document review and reporting system and store the copy in storage devices that are local to the data access system. Because the requested data is usually small in size, accessing the requested data from the data access system is more efficient and faster than accessing a huge repository of data stored at a document review and reporting system.

In an embodiment, an approach uses a data access system to facilitate reviewing, reporting and archiving of data quickly and efficiently. Because the data is stored locally with respect to the data access system, accessing the data from the data access system is more efficient and faster than accessing the data from an external document review and reporting system.

A data access system may be configured to receive requests, from client devices, for data that is stored either at a document review and reporting system or at a local storage unit of the data access system. The data access system may be configured to efficiently process the requests, quickly retrieve the requested data, and provide the requested data to the client devices relatively fast.

A data access system may be configured to receive requests from client devices for reviewing and reporting data. For example, the data access system may receive requests to provide statistical and performance-related information about individual data-reviewers, or groups of reviewers, who reviewed electronic documents that pertained to particular legal matters. Furthermore, the data access system may receive requests for providing performance statistics determined for all reviewers who reviewed evidence documents pertaining to particular matters and on particular days. The requests for the performance statistics may also include the requests for review analysis data, such as review progress information that may include document review rates, review ratios per reviewers, total counts of the documents reviewed by reviewers, counts of documents reviewed by reviewers hourly, counts of errors made by reviewers, and the like.

In an embodiment, a data access system is configured to receive requests for providing information about global and local trends observed in reviewing e-Discovery data, individual projects and groups of projects. For example, the data access system may receive requests for providing daily, monthly and/or yearly statistical information for the ongoing, completed or partially completed review projects.

Upon receiving requests, a data access system may retrieve pertinent data from either a local storage unit or a document review and reporting system, and based on the retrieved data, determine the requested performance-related and/or statistical information. The resulting information is transmitted to a client device that requested the information.

Upon receiving the performance-related and/or statistical information, a client device may generate a graphical user interface and use the graphical user interface to generate one or more graphs and charts to graphically represent the received information. The client device may use the graphical user interface to display the graphs and charts on a computer display device of the client device.

A data access system may receive additional requests for additional information from client devices. In response to the requests, the data access system may determine responses based on the locally stored data and transmit the responses to the client devices.

BRIEF DESCRIPTION OF THE DRAWINGS

In the figures of the accompanying drawings like reference numerals refer to similar elements.

FIG. 4A is a block diagram that depicts example requests for data.

FIG. 4B is a block diagram that depicts example requests for review analysis data.

FIG. 4C is a block diagram that depicts example requests for reporting data.

FIG. 18 is an example graph depicting review progress data.

FIG. 19 is an example graph depicting review report data.

FIG. 20 is an example graph depicting review session data.

DETAILED DESCRIPTION

Figure 1A:
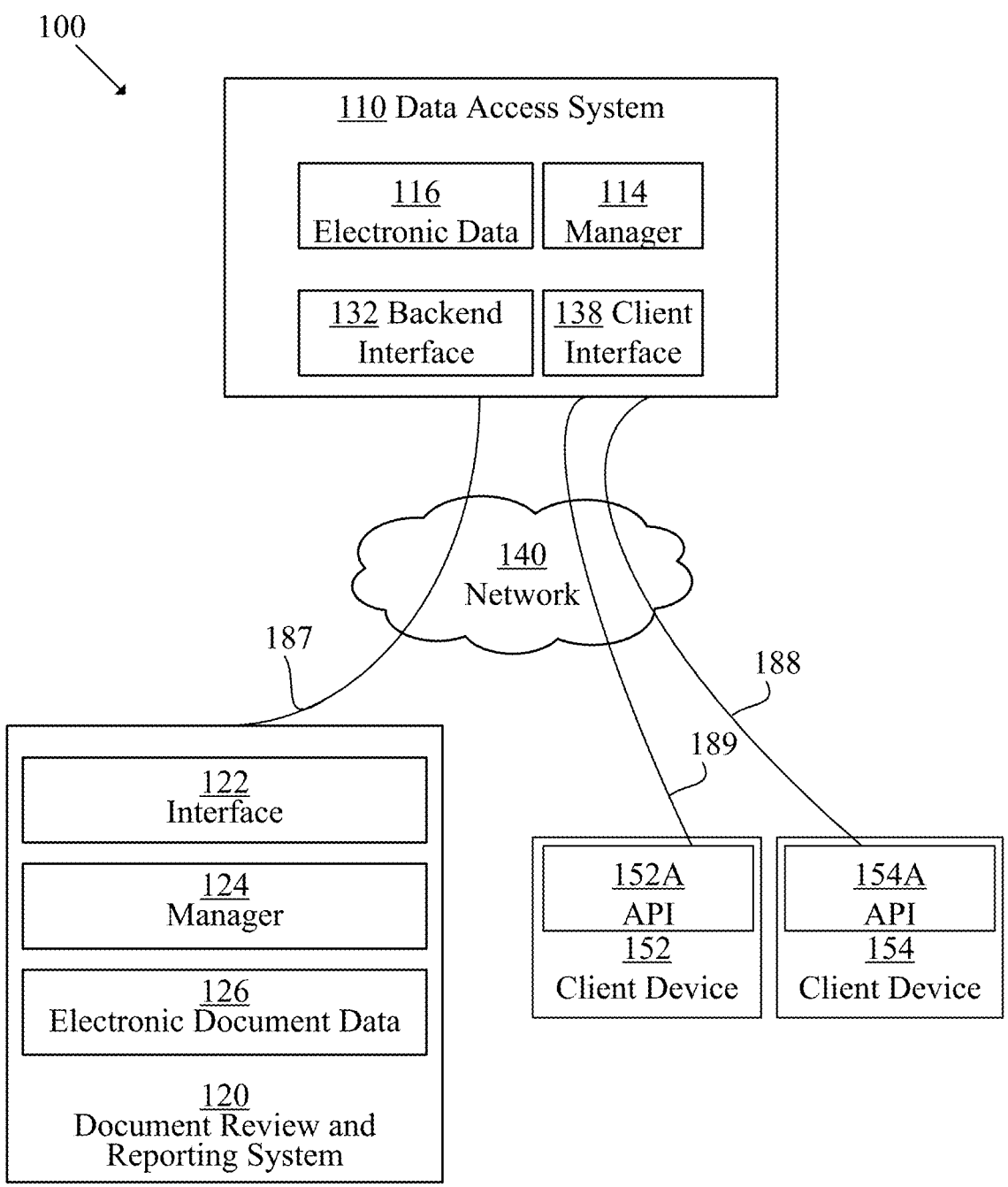
FIG. 1A is a block diagram that depicts an example arrangement for using a single-entry access point to archive data in and out of an electronic document review and reporting system.

In the following description, for the purposes of explanation, numerous specific details are set forth in order to provide a thorough understanding of the present approach. It will be apparent, however, to one skilled in the art that the present approach may be practiced without these specific details. In other instances, well-known structures and devices are shown in block diagram form in order to avoid unnecessarily obscuring the present approach. Various aspects of the approach are described hereinafter in the following sections:

I. OVERVIEW
II. SINGLE-ENTRY ACCESS POINT SYSTEM ARCHITECTURE
   A. Data Access System
   B. Document Review and Reporting System
   C. Client Devices
III. PROVIDING A SINGLE-ACCESS ENTRY POINT TO ARCHIVE DATA IN AND OUT OF AN ELECTRONIC DOCUMENT REVIEW AND REPORTING SYSTEM
   A. Example Arrangement for Retrieving, Reporting and Querying Data
   B. Example Time Chart for Retrieving, Reporting and Querying Data
   C. Example Flow Chart for Retrieving, Reporting and Querying Data
IV. REQUESTS FOR REVIEW ANALYSIS DATA
V. REQUESTS FOR REPORTING DATA
VI. EXAMPLE GRAPHS AND CHARTS DEPICTING REVIEW ANALYSIS DATA
   A. Review Progress Graphs
   B. Document Review Rate Pie-Charts
   C. Document Review Ratio Pie-Charts
   D. Total Documents Reviewed Ratio Charts E. User Document Review Rate Graphs
F. Reviewer Documents Reviewed Hourly Graphs
G. Average Native Size Review Rate Graphs
H. Review Ratio Pie-Charts
I. Total Documents Reviewed Pie-Charts
J. User Document Review Rate Graphs
K. Reviewer Documents reviewed Hourly Graphs
L. Total Native Size Reviewed Pie-Charts
M. Total Text Size Reviewed Pie-Charts
VII. EXAMPLE GRAPHS AND CHARTS DEPICTING REPORTING DATA
   A. Review Progress Graphs
   B. Review Report Graphs
   C. Review Session Graphs
   D. Files Size Trend Graphs
   E. Environment Size Trend Graphs
   F. Indexes Size Trend Graphs
   G. Database Size Trend Graphs
   H. Modified Indexes Size Trend Graphs
   I. Modified Environment Size Trend Graphs
   J. Modified Indexes Size Trend Graphs
   K. Modified Database Size Trend Graphs
   L. Document Growth Trend Graphs
   M. Natives Trend Graphs
   N. Files Growth Trend Graphs
   O. Top Workspaces Pie-Charts
   P. Top Workspaces-Databases Pie-Charts
   Q. Top Workspaces Size Pie-Charts
   R. Modified Top Workspaces-Databases Pie-Charts
   S. Daily Statistics Graphs
   T. Monthly Statistics Graphs
   U. Executive Summary Graphs
   V. Executive Summary Bar-Graphs
VIII. IMPLEMENTATION MECHANISMS I. Overview An approach is provided for using a single-entry access point to archive, retrieve, review and report data stored in a document review and reporting system. The approach uses a data access system to facilitate the single-entry access point to the data stored in the document review and reporting system, to store the accessed data locally at the data access system, and to facilitate reviewing, reporting and archiving of the data stored locally at the data access system.

A data access system may be configured with interfaces for accessing data stored at a document review and reporting system and interfaces for accessing data stored at the data access system. The data access system may also be configured with interfaces for providing the data retrieved from either the document review and reporting system or the local storage to client devices.

A data access system may be configured to receive requests from client devices for data. For example, the data access system may receive requests to provide statistical and performance-related information about individual reviewers, or groups of reviewers, who reviewed electronic documents that pertained to various legal matters and that have been stored in the document review and reporting system. The data access system may also receive reporting requests for providing information about global and local trends in review process of individual projects and/or group of projects, and/or providing daily, monthly and/or yearly statistical information for the ongoing, completed or partially completed review projects.

A data access system may be configured to process requests received from client devices, determine responses to requests, and provide the responses to the client devices.

II. Single-Entry Access Point System Architecture

FIG. 1A is a block diagram that depicts an example arrangement for using a single-entry access point to archive data in and out of an electronic document review and reporting system. Embodiments are not limited to the example arrangement 100 depicted in FIG. 1A and other example arrangements are described hereinafter.

In the example depicted in FIG. 1A, arrangement 100 includes a data access system 110, a document review and reporting system 120, and one or more client devices 152-154. Data access system 110 may be configured to receive, from client devices 152-154, requests for review analysis data and/or reporting data. Data access system 110 may be configured to retrieve the requested data from document review and reporting system 120, generate, based on the retrieved data, responses to the requests, and provide the responses to client devices 152-154 so that client devices 152-154 may display the responses using, for example, their own graphical user interfaces.

In FIG. 1A, data access system 110 may communicate with document review and reporting system 120 via a communications link 187. Furthermore, data access system 110 may communicate with a client device 152 via a communications link 189 and communicate with client device 154 via a communications link 188. Communications links 187, 189, 188 may be established across one or more computer networks such as a network 140.

Network 140 may include any number of computer-based networks, including one or more Local Area Networks ("LANs"), Wide Area Networks ("WANs"), Ethernet networks, Internet networks, satellite networks, or wireless networks. The elements depicted in arrangement 100 may also have direct communications links, configurations and types of which may vary and depend upon a particular implementation.

A. Data Access System

Data access system 110 may be configured to provide, to client devices 152-154, a single-entry access point to archive data in and out of document review and reporting system 120. To provide the single-entry access point, data access system 110 is configured to communicate with document review and reporting system 120 and one or more client devices 152-154. The communications may be facilitated via one or more computer networks 140.

Configurations of data access system 110 may vary. In an embodiment, data access system 110 includes a manager module 114, a client interface 138, a backend interface 132, and a storage unit configured to store electronic data 116. In other embodiments, data access system 110 may include additional elements.

Manager 114 of data access system 110 may be configured to establish communications connections with document review and reporting system 120, and with one or more client devices 152-154. The communications with document review and reporting system 120 may be established using backend interface 132, and communications with client devices 152-154 may be established using interface 138.

Manager 114 of data access system 110 may be also configured to receive requests from devices 152-154, process the requests, retrieve the requested data, generate responses to the requests based on the retrieved data, and transmit the responses to client devices 152-154.

B. Document Review and Reporting System

Document review and reporting system 120 may be configured to store and provide data including, for example, e-Discovery related data. It may also be configured to provide enhanced and robust data collection capabilities, data review capabilities, data reporting capability, and search capabilities.

In an embodiment, document review and reporting system 120 includes an interface 122, a manager 124, and one or more storage units for storing electronic document data 126.

Document review and reporting system 120 may be equipped with a console (not depicted in FIG. 1A) for entering data, querying the stored data, and receiving the commands for generating review summaries and reporting data.

Document review and reporting system 120 may be implemented by hardware, computer software, or any combination of hardware and computer software configured to manage electronic documents. One non-limiting example implementation of document review and reporting system 120 is a full-feature, Relativity™ e-Discovery management platform.

Document review and reporting system 120 may be configured to store electronic document data 126. Document data 126 may be any type of electronic data and may be stored in any form, including structured data and unstructured data. The data may be stored in any of the native formats, image formats, document formats, and the like. A native document is a document that is in its original, non-translated, not converted version or format. Examples of electronic document data 126 include, without limitation, word processing documents, image files, emails, spreadsheet documents, source code files, and the like.

In an embodiment, document review and reporting system 120 is configured as an interactive system for storing data and supporting reviews of the data, an analysis of the data, processing of the data, searching of the data, and archiving of the data. The document review and reporting system may be configured to support the document tagging, document tracking, and document editing. The document review and reporting system may be implemented in a cloud computer-based system, a main-frame system, one or more networks of computer servers, and the like.

C. Client Devices

Client devices 152-154 may be configured to generate requests for data, transmitting the requests to data access system 110, receiving responses to the requests, and providing the responses to users of client devices 152-154. Client devices 152-154 may be any type of client devices that can be used to communicate with data access system 110.

Client device 152 may be equipped with an application programming interface ("API") 152A, a web browser application (not depicted in FIG. 1A), and/or any other application configured to receive, request, and search, or browse data. Similarly, client device 154 may be configured with an API 154A, a web browser application (not depicted in FIG. 1A), and/or any other application configured to receive, request, and search, or browse data.

Client device 152/154 may be any type of computer device, and the type of the computer device depends upon a particular implementation. Example client devices include, without limitation, personal or laptop computers, workstations, tablet computers, personal digital assistants ("PDAs") and smart phones. Client devices 152-154 may include other elements, such as user interfaces, computer processors and memory units, including volatile memory and non-volatile memory.

Figure 1B:
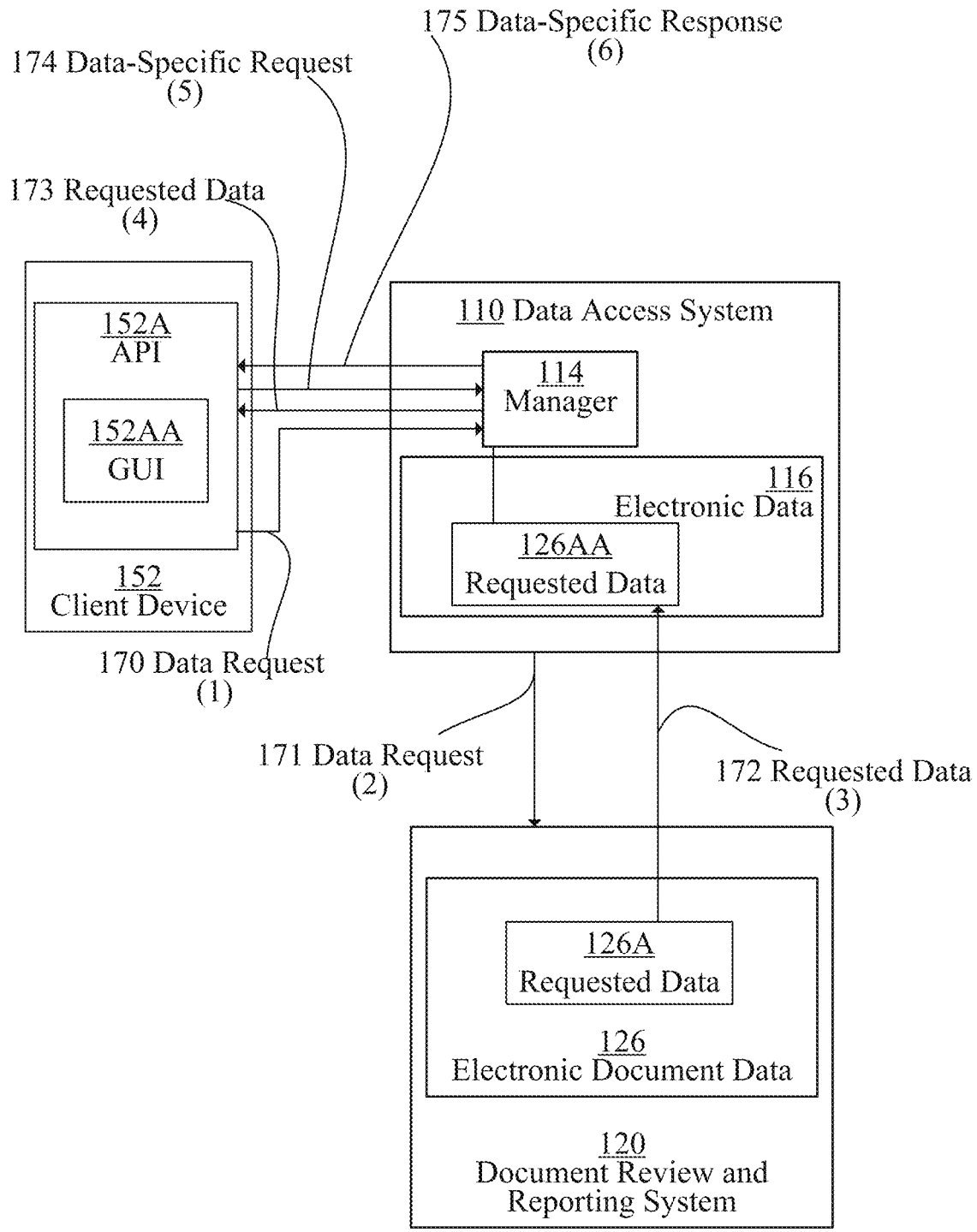
FIG. 1B is a block diagram that depicts an example arrangement for retrieving, reporting and querying data using a single-entry access point system.

III. Providing a Single-Access Entry Point to Archive Data In And Out of an Electronic Document Review and Reporting System FIG. 1B is a block diagram that depicts an example arrangement for retrieving, reporting and querying data. The arrangement depicted in FIG. 1B shows communications exchanged via communications connections established between data access system 110, document review and reporting system 120, and client device 152.

A. Example Arrangement for Retrieving, Reporting and Querying Data

In a depicted example, client device 152 generates a data request 170, referred to as (1). Data request 170 may be any type of request for performance/statistical information about reviewers, reviewing processes, reviewed documents, reviewed matters, as well as requests for reports on global trends observed in reviewing processes, statistical information about the pending and/or processes matters, executive summaries, and the like. Data request 170 may include, for example, a specification of type of data that is requested, a workspace for which the data request pertains, a time period that describes a range of the data that is requested, or any other identification of the requested data.

Data request 170 may be communicated from API 152A of client device 152 to manager 114 of data access system 110.

Upon receiving data request 170, manager 114 of data access system 110 processes the request and generates a data request 171 (referred to as (2)). Data request 171 is sent to document review and reporting system 120.

Upon receiving data request 171, document review and reporting system 120 processes the request, determines the data that is requested, and retrieves that requested data from document review and reporting system 120. Furthermore, document review and reporting system 120 transmits requested data 126A as requested data 172 (referred to as (3)) to data access system 110.

Data access system 110 stores the requested data as requested data 126AA, which is a portion of electronic data 116 in data access system 110.

Upon receiving requested data 126AA, data access system 110, or manager 114 of data access system 110, provides requested data 173, referred to as (4), to client device 152. The received data is then processed by the application 152A, and the received data may be used to generate a graphical user interface ("GUI") 152AA and displayed using GUI 152AA.

As a user of client device 152 reviews and browses the received data, the user may request additional information pertaining to the received data or may request information related to some other data. For example, if the received data is depicted in a graph that shows a plot between a count of documents that had been reviewed within a given time period, then the user may request additional information for a particular data point on the graph. The user may also request additional information about the reviewer who performed a particular review or worked on a particular project. Hence, as a user of a client device 152 generates a data-specific request 174, referred to as (5), data-specific request 174 may include a request for additional data for a particular data point depicted or included in a graph displayed using GUI 152AA.

Upon receiving data-specific request 174, manager 114 may process data-specific request 174, determine additional data for the particular data point, and return a data-specific response 175 (referred to as (6)) to client device 152. Manager 114 may determine the additional data for the particular data point based on requested data 126AA stored locally at data access system 110 or may determine the additional data by retrieving the additional data from document review and reporting system 120.

The process of exchanging requests and responses between client device 152 and data access system 110 may be repeated multiple times and may involve requesting and obtaining additional information. It may also involve obtaining different types of information either directly from data access system 110, or indirectly from document review and reporting system 120, or both.

B. Example Time Chart for Retrieving, Reporting and Querying Data

Figure 2:
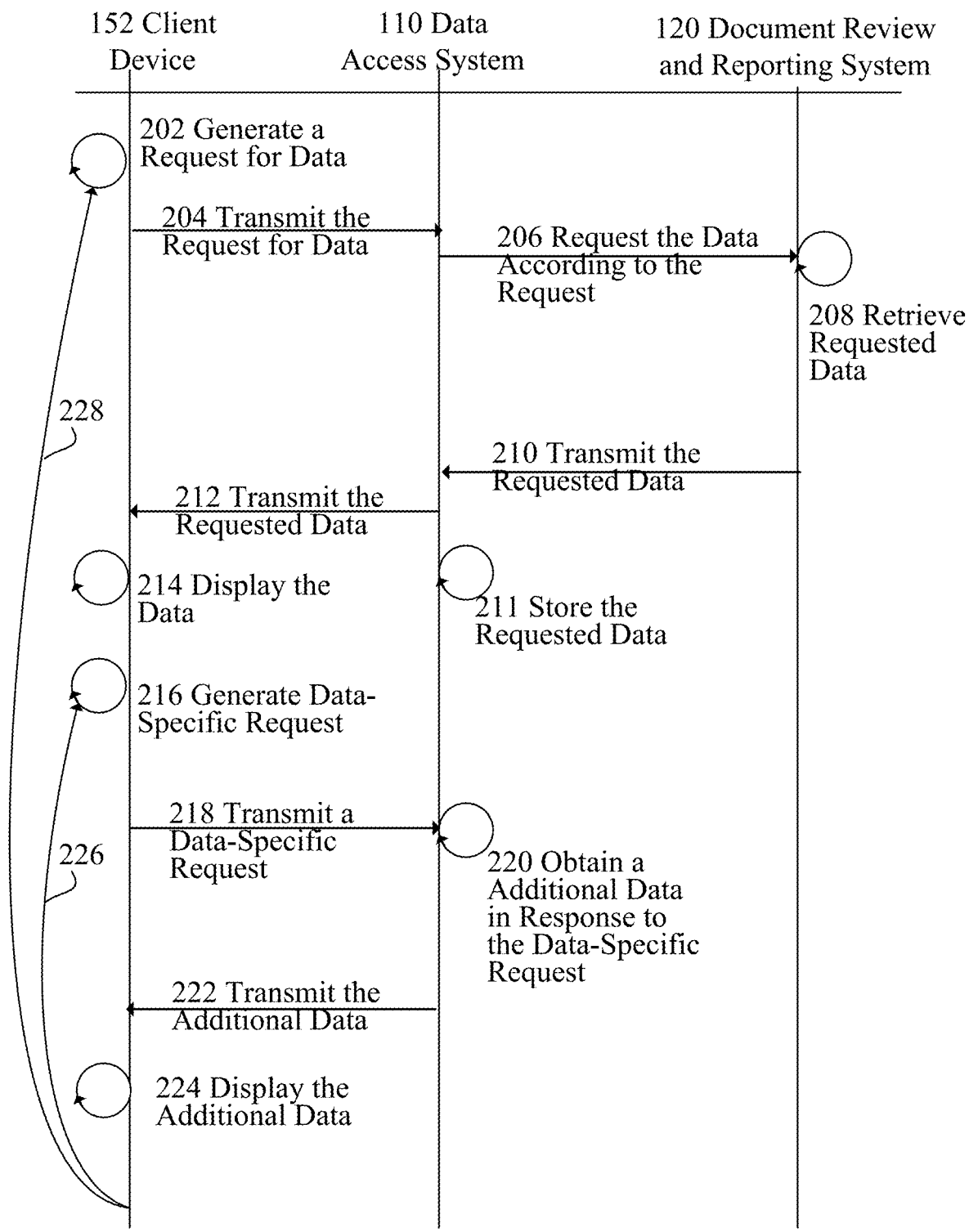
FIG. 2 is an example time chart for retrieving, reporting and querying data using a single-entry access point system.

FIG. 2 is an example time chart for retrieving, reporting and querying data using a single-entry access point system. The depicted example illustrates communications exchanged between client device 152, data access system 110, and document review and reporting system 120.

In step 202, client device 152 generates a request for data. The request may pertain to requesting performance/statistical information about reviewers, reviewing processes, reviewed documents, reviewed matters, as well as requests for reports on global trends in reviewing processes, statistical information about the pending and/or processes matters, executive summaries, and the like.

In step 204, client device 152 transmits the request for data to data access system 110. This may be facilitated by sending an API request, a command, or a hyperlink pointing to a file containing the request.

In step 206, data access system 110 receives the request from client device 152, parses the request to determine a type of data that is requested, a location of the requested data, and the like. If the requested data is not stored locally, then data access system 110 transmits the request for data from data access system 110 to document review and reporting system 120 to retrieve the requested data from document review and reporting system 120 and to copy the retrieved data to a local storage unit.

For example, if the requested data is not stored locally, then, in step 208, document review and reporting system 120 retrieves the requested data from document review and reporting system. This may include retrieving data from a cloud computer-based system maintained by document review and reporting system 120, issuing a query for the requested data to a data repository maintained by document review and reporting system 120, and the like.

In step 210, document review and reporting system 120 transmits the requested data from document review and reporting system 120 to data access system 110.

Upon receiving the requested data, data access system 110 may store the data locally. For example, data access system 110 may store the requested data in a storage unit that is local with respect to data access system 110.

In step 212, data access system 110 transmits the requested data from data access system 110 to client device 152.

In step 214, client device 152 receives the requested data, which now may be referred to as received data.

Based on the received data, client device 152 may generate a GUI, and display the received data using the GUI. The received data may be displayed as charts, graphs and other graphical representations. For example, if the received data includes statistical information about counts of documents that have been reviewed by certain reviewers and within a certain time period, then the GUI may present the received data using one or more graphs showing plots of counts of documents that had been reviewed by each of the reviewer within a given time period, showing plots of reviewing rates for each of the reviewer within a given time period, showing plots of relative efficiency of each of the reviewer, and the like.

As a user of client device 152 reviews the graphs generated by the GUI executing on client device 152, the user may decide to request additional data or request new data. For example, the user may generate, in step 216, a data specific request for providing additional information for a particular data point of a plurality of data points included in a graph displayed using the GUI. An example of data-specific request may be a request for additional information associated with a particular data point shown in one of the graphs provided as part of the received data.

In step 218, client device 152 transmits a data-specific request from client device 152 to data access system 110.

In step 220, data access system 110 receives the data-specific request and obtains additional data in response to receiving the data-specific request. In this step, data access system 110 may, for example, access the requested data stored locally at the data access system and determine additional information for the particular data point. Alternatively, data access system 110 may access document review and reporting system 120 to retrieve the additional information for the particular data point from document review and reporting system. The additional information associated with the particular data point may indicate some additional details pertaining to the particular data point, such an exact efficiency rate for a particular reviewer, an exact date/time when a particular reviewer completed his/her task, an exact count of reviewer that working on a particular reviewing project on a particular date/time, and the like.

In step 222, data access system 110 transmits the additional data to client device 152.

In step 224, client device 152 receives the additional data, updates the GUI, and displays the additional data using the updated GUI. For example, if the additional data provides some additional details about the particular data point, then, upon receiving the additional data, client device 152 may refine the depiction of the received data in the GUI by overlaying the additional data over the previously displayed received data or may add additional graphical elements depicting the additional data to the already displayed received data.

The process of requesting additional specific data, requesting new data, and receiving responses to the requests may be repeated multiple times as shown in FIG. 2. For example, upon displaying the additional data, client device 152 may proceed to step 216 as shown by an arrow labeled with 226 or may proceed to step 202 as show with an arrow labeled with 228.

C. Example Time Chart for Retrieving, Reporting and Querying Data

Figure 3:
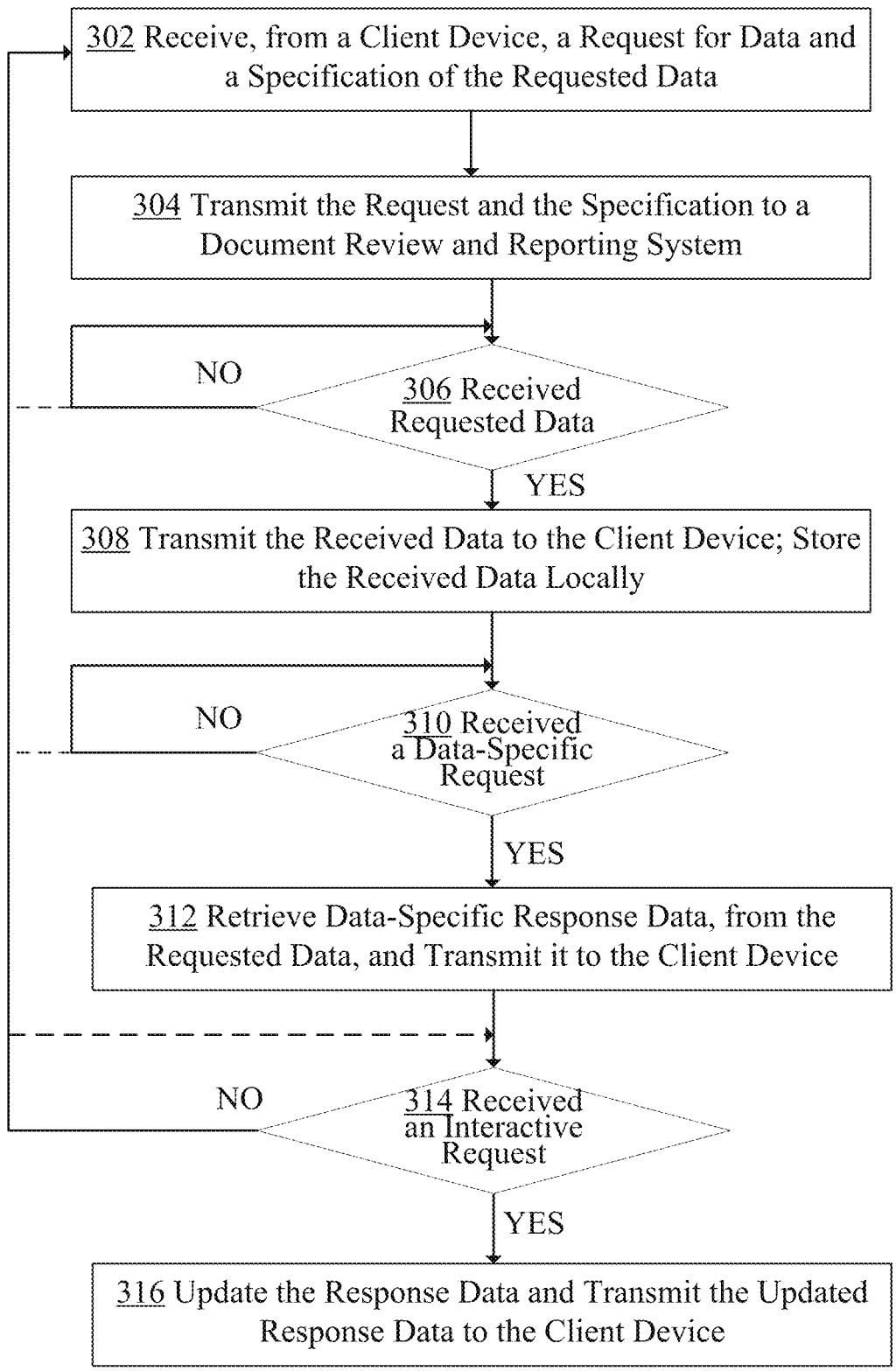
FIG. 3 is an example flow chart for retrieving, reporting and querying data using a single-entry access point system.

FIG. 3 is an example flow chart for retrieving, reporting and querying data using a single-entry access point system. In an embodiment, the depicted steps are executed by a data access system, such as data access system 110 shown in FIG. 1A. In an embodiment, the depicted steps may be executed by a manager, such as manager 114, of data access system 110.

In step 302, a data access system receives from a client device a request for data. The request may specify a type of data that is requested, a location of the requested data, a manner in which the requested data is to be presented, and the like. The request may specify, for example, a workspace for which the data is requested, a reviewer or a group of reviewers whose performance and efficiency data is requested, a type of report or a time period for which the report is requested, and so forth.

In step 304, the data access system transmits the request and the specification of the requested data to a document review and reporting system.

In step 306, the data access system tests whether the data access system received the requested data. If the requested data is received, then the data access system proceeds to step 308. Otherwise, the data access system awaits the requested data in step 306 or awaits another request from the client device in step 302.

In step 308, the data access system processes the requested data to conform them to the type, format, and so forth, requested by a user of the client device. Then, the data access system transmits the received and conformed data to the client device. In addition, the data access system stores the received data locally. For example, the data access system may store the received data in a local storage unit.

In step 310, the data access system tests whether it has received a request for additional data. If such a request has been received, then the data access system proceeds to step 312. Otherwise, the data access system awaits a request in step 310 or awaits a request for new data in step 302.

In step 312, the data access system retrieves the additional data. If the requested additional data has been already stored locally, then the data access system may retrieve the data from a local storage; otherwise, the data access system may retrieve the additional data from the document review and reporting system.

In an embodiment, the additional data is retrieved in response to receiving a request for additional data. If the request for the additional data pertained to additional information for a particular data point of the data point displayed in one of the charts shown in the GUI, then, in step 312, the data access system may retrieve the additional data for that particular data point and transmit the additional data for the particular data point to the client device.

In step 314, the data access system tests whether it has received another request, such as an interactive request. An interactive request may include a request for additional information for a given chart, additional information for a different chart, a request for a new chart, or a request for another report, another review data, or an executive summary data. If such a request is received, then the data access system proceeds to performing step 316. Otherwise, the data access system awaits a new request in step 314 or in step 310 or in step 302.

In step 316, the data access system obtains a response to the interactive request and transmits the response to the client device causing the client device to generate or updating the GUI and displaying the updated response data using the GUI.

IV. Requests for Review Analysis Data

FIG. 4A is a block diagram that depicts example requests for data. In an embodiment, a request for data 402 includes a specification of the type of data that is requested. For example, request for data 402 may include a specification 404, which may specify a workspace for which the data is requested, a user or a group of users for whom the data is requested, a reviewer or a group of reviewers for whom the data is requested, error rates made by reviewers for projects for which the data is requested, and so forth.

FIG. 4B is a block diagram that depicts example requests for review analysis data. In an embodiment, a request for review analysis data 406 may include requests for performance and statistical data pertaining to efficiency, completeness, accuracy, and so forth, of work performed by reviewers, group of reviewers, users, groups of users, and so forth.

In an embodiment, request for review analysis data 406 is a request for indicators of the quality of reviews performed by reviewers who review e-Discovery data. The indicators may capture performance data pertaining to reviews of the e-Discovery data by individual reviewers, updates per project, updates per groups of reviewers and so forth.

In an embodiment, request for review analysis data 406 includes a specification 408 that specifies whether the request is for any one or more of: progress data, data pertaining to the hourly summaries performed by reviewers, report data pertaining to reviewed documents, sessions data pertaining to beginning and end of the sessions, errors made during the review sessions, summaries of jobs performed and/or currently running or performed by the reviewers, and so forth.

In an embodiment, specification 408 specifies a request for progress data. Examples of graphs and charts that may be provided or generated in response to such a request include charts for a review progress, charts depicting document review rates, charts depicting review ratios per reviewers, charts depicting total documents reviewed by reviewers, user document review rates, charts pertaining to document reviewed hourly, charts pertaining or depicting average native sizes of reviewed documents and the reviews rate, charts depicting total native sizes of reviewed documents and the reviews rates, charts depicting total text sizes reviewed, and so forth.

In an embodiment, specification 408 is a request for data indicating hourly summaries per reviewers including rates, charts for text review rates, charts for native review rates, charts for total text reviewed, charts showing error counts, and so forth.

In an embodiment, specification 408 is a request for report data pertaining to reviewers and/or review processes. This may include a request for data for generating charts per reviewer including counts of reviewer documents, charts for document review rates, charts for text review rates, charts for native review rates, charts for total native summary, and so forth.

In an embodiment, specification 408 includes a request for data pertaining to reviewing sessions data. The reviewing sessions data may be used to generate charts per matters and/or per environment identifiers, charts depicting the session start times and the session end times, charts depicting session errors, charts depicting session lengths, charts depicting user artifacts identifiers, charts depicting reviewers' names, charts depicting users/reviewers addresses, charts depicting case artifacts identifiers, and so forth.

In an embodiment, specification 408 includes a request for jobs data. The jobs data may be used to generate charts such as summary charts of currently running jobs, jobs completed, jobs ready to be performed, and so forth.

V. Requests for Reporting Data

FIG. 4C is a block diagram that depicts example requests for reporting data. A request for reporting data 422 may be any type of request for data that can be used to generate reports pertaining to review processes, statistical reviews, and so forth. This may include reports pertaining to review processes of e-Discovery data, and the like.

In an embodiment, a specification of the requested reported data 424 comprises requests for global trends, statistical information, executive summary, and so forth.

In an embodiment, specification 424 for global trends is a request for providing data that can be used to generate charts for selected environments. The charts may include review reports for the environments, such as workspaces, projects, matters, cases, and the like. The charts may also include depictions of start dates of the reviews, end dates of the reviews, and so forth. For the selected environment and dates, the requested data may be used to generate a file size trend chart, an environment size trend chart, an indexes size trend chart, a database size trend chart, a document growth trend chart, a native trend chart, an image trend chart, a production images trend chart, a files growth trend chart, a workspace growth trend chart, and so forth.

In an embodiment, specification 424 is a request for statistical data pertaining to data review processes. The statistical data may be used to generate charts depicting daily statistics, monthly statistics, top workspace statistics, document review progress statistics, and so forth.

In an embodiment, specification 424 is a request for an executive summary. The executive summary may provide data that can be used to generate charts depicting one-line representations of monthly total size of reviewed documents, active-archived-deleted documents in the past 30 days or almost deleted, near-deleted, tested, and so forth.

The executive summary may also include requests for data that can be used to generate charts for depicting block representations of monthly total sizes of reviewed documents. It may also include active-archived-deleted matters in the 30 days, deleted matters, nearline, tested matters, and so forth. Furthermore, it may also include requests for data to be used to generate monthly new cases reports, monthly new case reports in gigabyte sizes, and monthly total users reports, and so forth.

VI. Example Graphs and Charts Depicting Review Analysis Data

A. Review Progress Graphs

Figure 5:
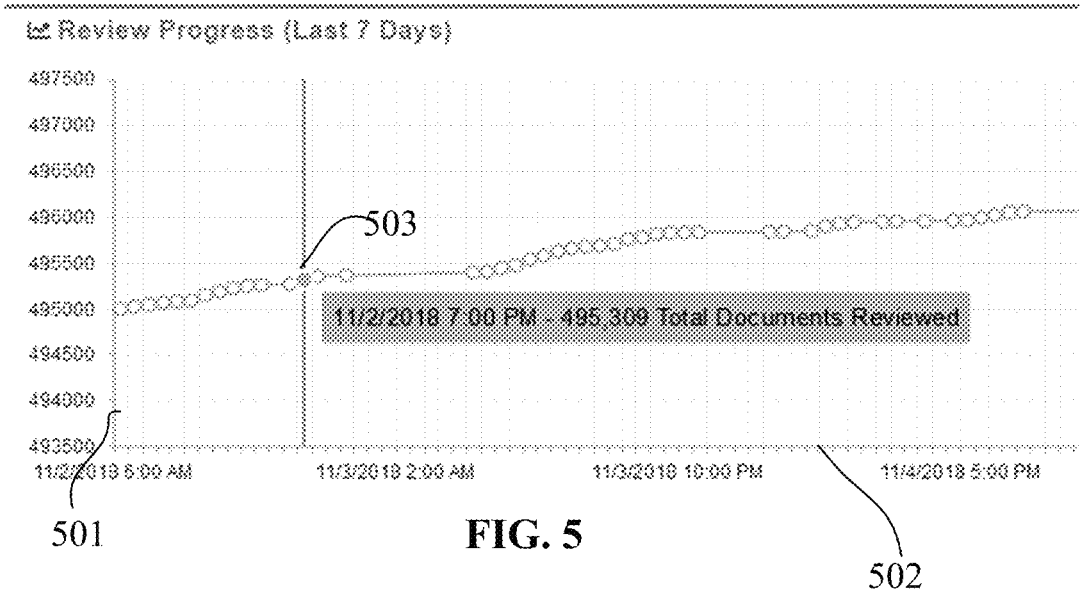
FIG. 5 is an example graph depicting review analysis data.

FIG. 5 is an example graph depicting review analysis data. FIG. 5 includes a two-dimensional chart labeled by a Y axis 501 and a X axis 502, where Y axis 501 shows a number of documents that have been reviewed, while X axis 502 is a time axis, and shows a range labeled by dates and times. In a depicted example, the plot shows the number of documents being reviewed on a given day.

A user of a client device may request additional data. For example, a user may use a pointing device, and position that pointing device to the plot, and upon selecting a particular point 503 on the plot, the client device may generate a request for additional data for the particular data point. That request may be communicated to an access data system, and the additional data may be retrieved from a local storage by the access data system and provided to the user. In FIG. 5, the additional data shows a total count of documents that have been reviewed on a given day at a given time.

B. Document Review Rate Graphs

Figure 6:
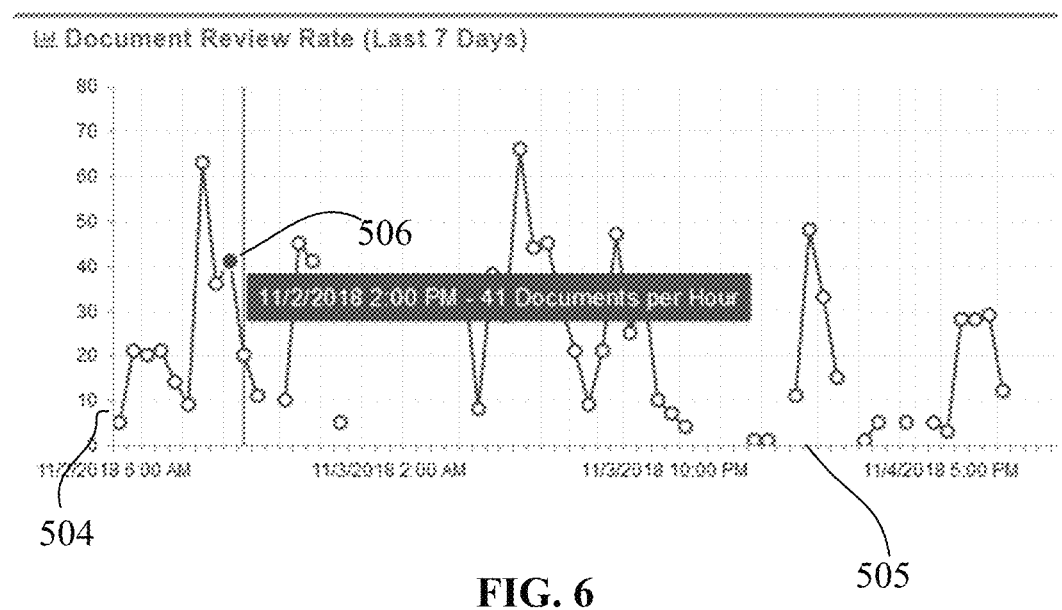
FIG. 6 is an example graph depicting document review rate data.

FIG. 6 is an example graph depicting document review rate data. In FIG. 6, the chart is a two-dimensional chart showing along a Y axis 504 a document review rate within last seven days and showing along a X axis 505 the time range labeled by the date, and the time of day. The chart is a plot, and a user may request additional information by pointing a pointing device to a particular data point 506 on a plot and requesting additional data such as data indicating a count of documents reviewed per hour on a given day and on a given time.

C. Document Review Ratio Pie-Charts

Figure 7:
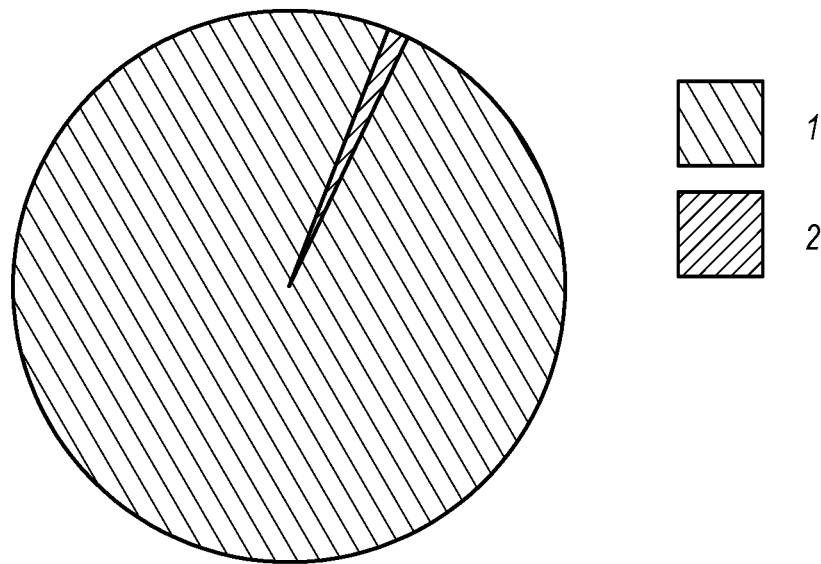
FIG. 7 is an example pie-chart depicting document review ratio data.

FIG. 7 is an example pie-chart depicting document review ratio data. FIG. 7 shows review ratios for two groups of documents. The first group includes the documents that have been already reviewed. The second group includes the documents that have not been reviewed. The pie-chart in FIG. 7 shows that pretty much all documents have been already reviewed, and only very few documents have not been reviewed.

D. Total Documents Reviewed Ratio Pie-Charts

Figure 8:
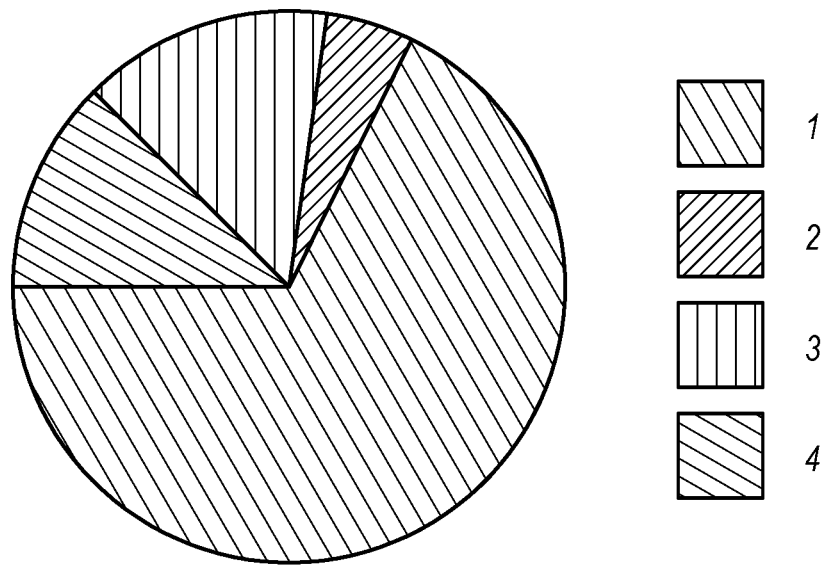
FIG. 8 is an example pie-chart depicting total documents reviewed ratio data.

FIG. 8 is an example pie-chart depicting total documents reviewed ratio data. In FIG. 8, a pie-chart shows a total document review share of the top 15 reviewers and performed by the top 15 reviewers. Each reviewer is identified by the reviewer's identifier and the count of document the reviewer reviewed. The data is color-coded or color-shaded according to a certain color scheme. FIG. 8 shows a relative ratio between the documents reviewed by the individual reviewers.

E. User Document Review Rate Graphs

Figure 9:
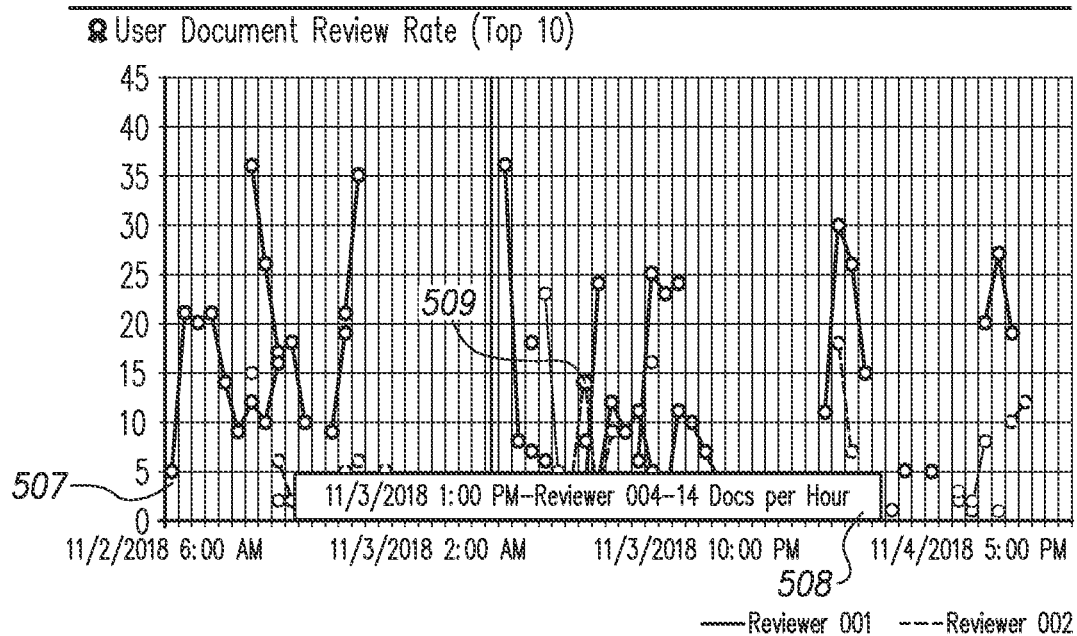
FIG. 9 is an example graph depicting user document review rate data.

FIG. 9 is an example graph depicting user document review rate data. In FIG. 9, the plot illustrates the relationship between the review rates (a Y axis 507) and individual reviewers plotted against a time axis 508 labeled by dates and times. In the depicted example, there are multiple graphs. Each of them corresponds to a different reviewer. By inspecting the graph, one can determine which reviewers are most efficient and which are not. As in previous graphs, a user may request additional data by pointing to a data point 509 and requesting additional data for that particular data point.

F. Reviewer Documents Reviewed Hourly Graphs

Figure 10:
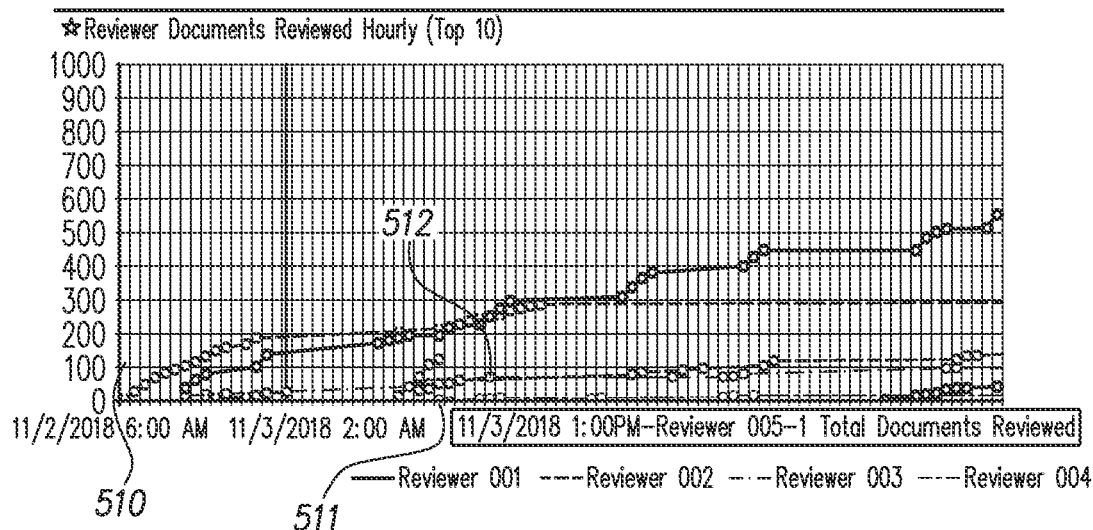
FIG. 10 is an example graph depicting reviewer documents reviewed hourly data.

FIG. 10 is an example graph depicting counts of document reviewed hourly data. Specifically, FIG. 10 depicts several plots, each of them is generated for a different reviewer, and the plots show the relationship between a count (a Y axis 510) of documents reviewed by a given reviewer within an hour, and a time axis 511 labeled by the date and the time. By inspecting the graph, one can identify the reviewers that are the most efficient and most productive. As in previous examples, a user of a client device may request additional data for any data point 512 shown in a graph by selecting any of the data points depicted in FIG. 10.

G. Average Native Size Review Rate Graphs

Figure 11:
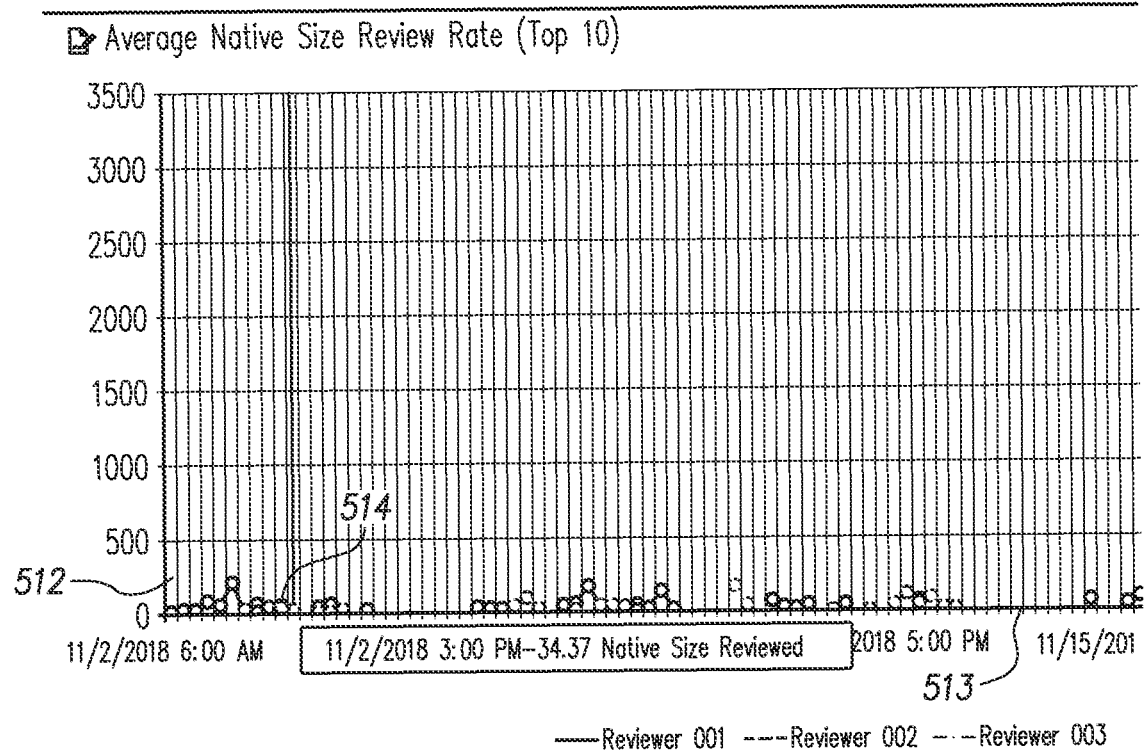
FIG. 11 is an example graph depicting average native size review rate data.

FIG. 11 is an example graph depicting average native size review rate data. The graphs shown in FIG. 11 depict relationships between native size review rates and individual reviewers. For example, for each reviewer from a list of reviewers, the graph may depict the count (a Y axis 5122) of native size review rate plotted along a time axis 513. The native size review rate that was determined for a given reviewer. As in previous examples, a user of a client device may request additional data for a given data point 514.

H. Review Ratio Pie-Charts

Figure 12:
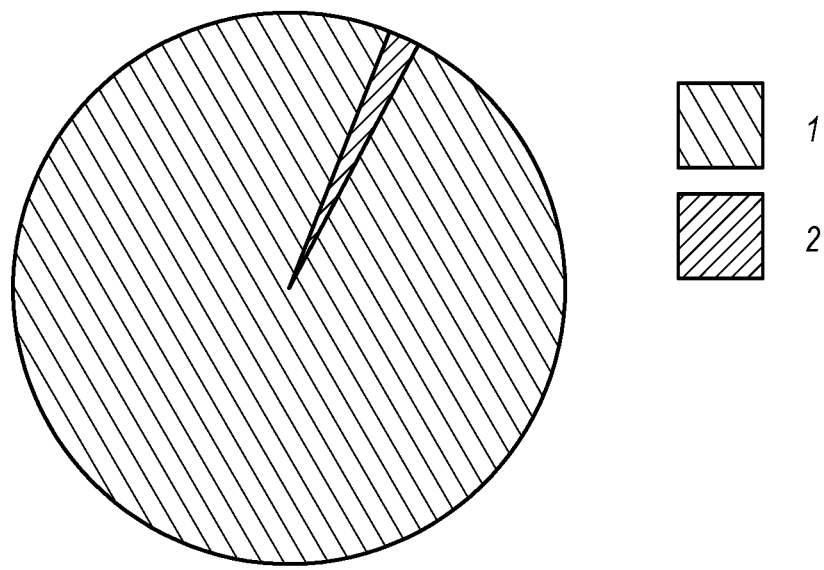
FIG. 12 is an example graph depicting review ratio data.

FIG. 12 is an example graph depicting review ratio data. FIG. 12 is an example pie-chart depicting review analysis data, and in particular, review ratios. FIG. 12 depicts a relationship of the review ratios between the reviewed documents and not reviewed documents. In this example, it appears that all the documents or almost all the documents have been reviewed, and almost none have not been reviewed.

I. Total Documents Reviewed Pie-Charts

Figure 13:
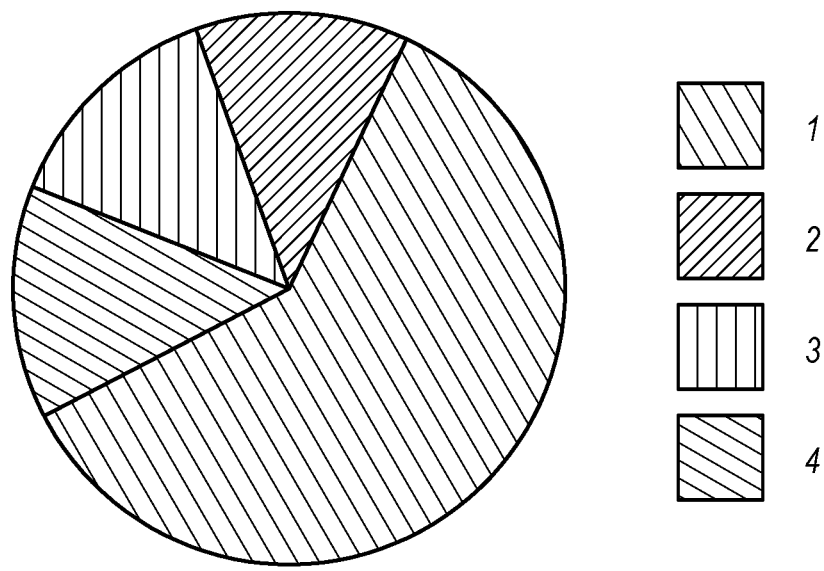
FIG. 13 is an example graph depicting total documents reviewed data.

FIG. 13 is an example graph depicting total documents reviewed data. FIG. 13 is an example pie-chart depicting data showing counts of total documents that have been reviewed per individual reviewers. In a depicted chart, each individual pie-chart portion is associated with a different reviewer. As in previous example, a user of a client device may request additional information about either a particular reviewer or a count of the total document reviewed for the particular reviewer.

J. User Document Review Rate Graphs

Figure 14:
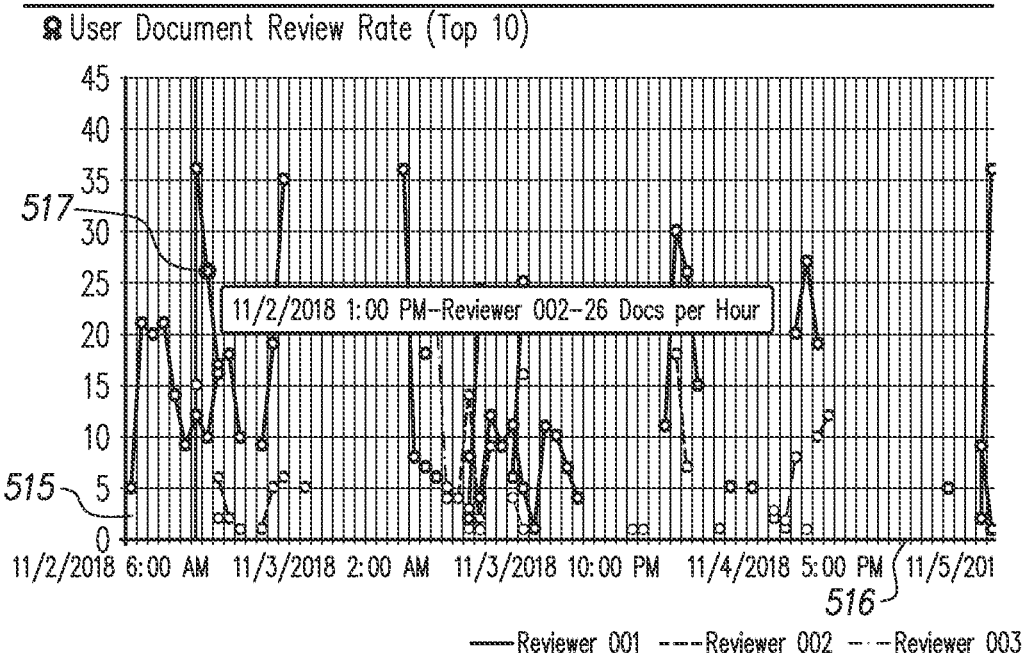
FIG. 14 is an example graph depicting user document review rate data.

FIG. 14 is an example graph depicting user document review rate data. FIG. 14 is an example graph depicting data indicating user document review rates. The graph includes several plots. Each of the plots is associated with a different reviewer. The plot shows the relationship between a user document review rate (a Y axis 515) of a particular reviewer within a particular timeframe (a X axis 516). As in previous examples, a user of a client device may request additional data for a data point 517 depicted in the graph shown in FIG. 14.

K. Reviewer Documents reviewed Hourly Graphs

Figure 15:
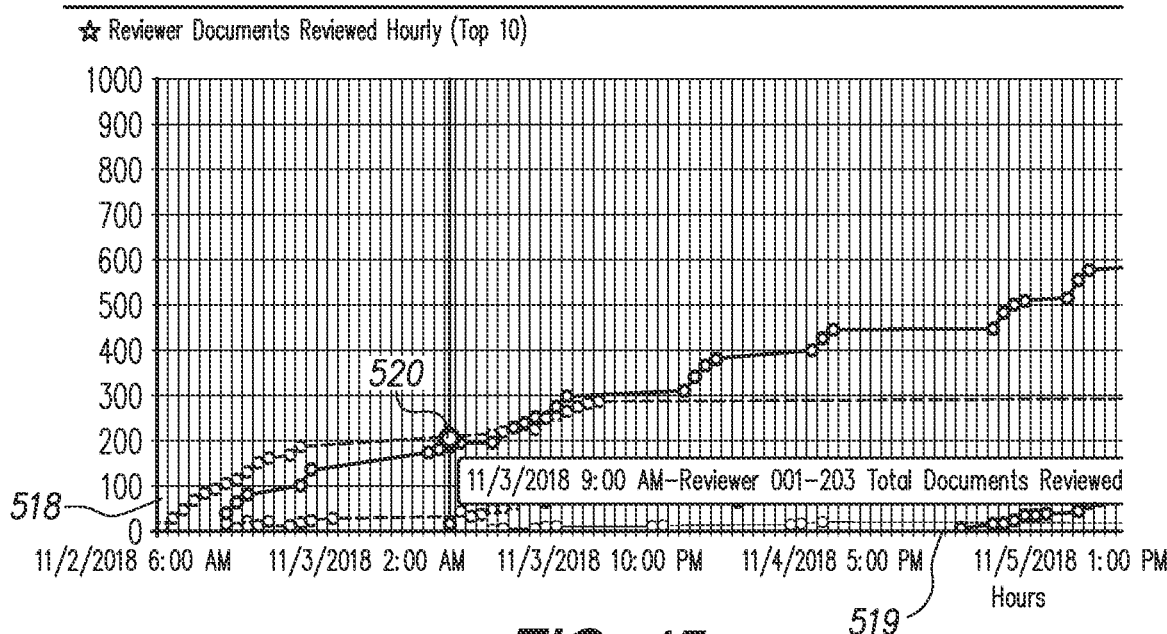
FIG. 15 is an example graph depicting reviewer documents reviewed hourly data.

FIG. 15 is an example graph depicting reviewer documents reviewed hourly data. The graph depicted in FIG. 15 includes several graphs. Each of them is associated with a different reviewer. For a given data point of a given plot represents a relationship between a count of documents (a Y axis 518) reviewed hourly by the given reviewer at a given time (a X axis 519). As in previous examples, a user of a client device may request additional data for a data point 520.

L. Total Native Size Reviewed Pie-Charts

Figure 16:
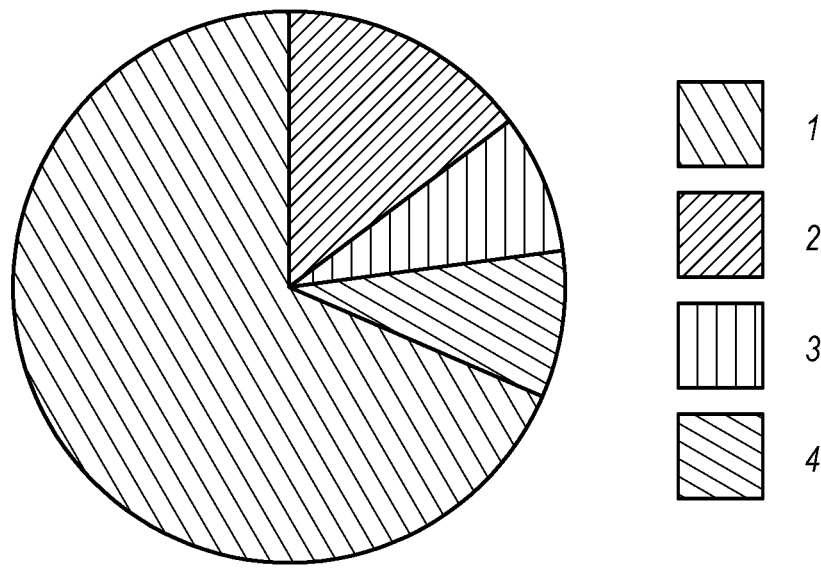
FIG. 16 is an example pie-chart depicting total native size reviewed data.

FIG. 16 is an example pie-chart depicting total native size reviewed data. In FIG. 16, each of a pie-chart portion is associated with a different reviewer, and the chart itself shows a relation between the native size reviewed by individual reviewers.

M. Total Text Size Reviewed Pie-Charts

Figure 17:
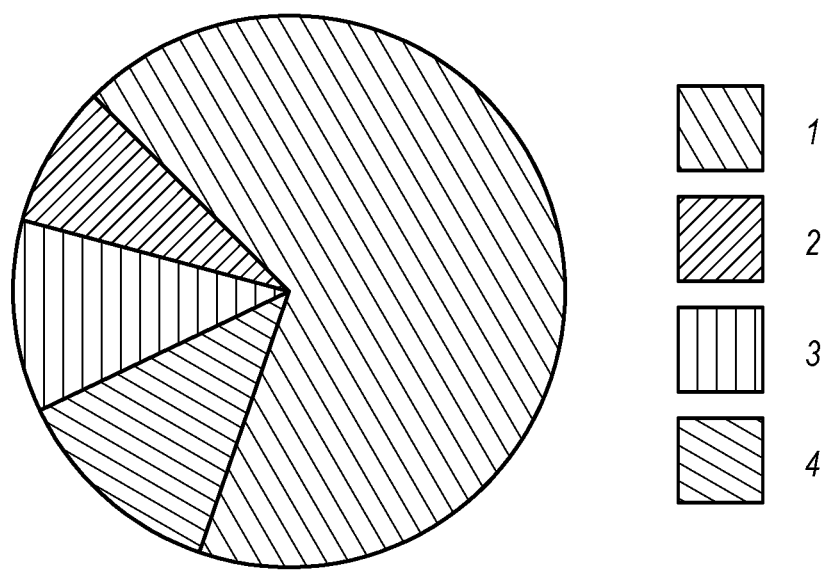
FIG. 17 is an example pie-chart depicting total text size reviewed data.

FIG. 17 is an example pie-chart depicting total text size reviewed data. The depicted pie-chart shows review analysis data pertaining to a total text size reviewed per individual reviewers. The pie-chart shown in FIG. 17 depicts a relative relationship between the text size of reviewed documents by the individual reviewers.

VII. Example Graphs and Charts Depicting Reporting Data

A. Review Progress Graphs

FIG. 18 is an example graph depicting review progress data. In FIG. 18, the graph shows two reviewers 530-531, review rates for each of the reviewers, text review rates for each of the reviewers, and times at which the reviewers performed their reviews. For example, the summary shown in FIG. 18 indicates that reviewer 530 reviewed at least eight documents on Oct. 3, 2018 and had a text review rate of 84.44 kilobytes per hour.

B. Review Report Graphs

FIG. 19 is an example graph depicting review report data. In this graph, information determined for each reviewer 532-533 is organized differently than it was in FIG. 18. In FIG. 19, the information is organized by a reviewer, and provides data pertaining to the document, a count of reviewed document, a time of reviewed documents, and a text review ratio.

C. Review Session Graphs

FIG. 20 is an example graph depicting review session data. Data in FIG. 20 is organized by job identifiers, including identifiers 534-535. A job identifier may be a matter identifier, a task identifier, and so forth. In FIG. 20, for a given job identifier, a summary window provides additional information such as an environment instance, a session start-date and a session start-time, a session end-date and time, and so forth.

D. Files Size Trend Graphs

Figure 21:
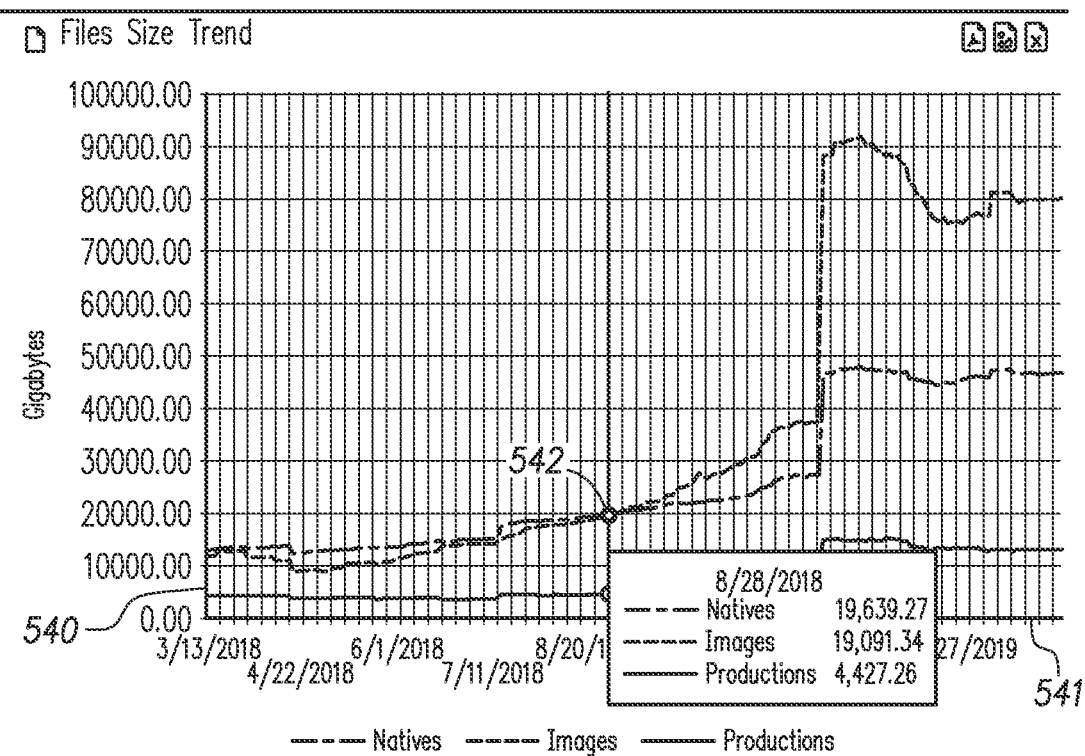
FIG. 21 is an example graph depicting files size trend data.

FIG. 21 is an example graph depicting files size trend data. Data depicted in FIG. 21 shows a relationship between a count (a Y axis 540) of gigabytes of files that are being reviewed at a given time (a X axis 541). The data in FIG. 21 may include a plot corresponding to the native files, image files, and production files. As in previous examples, a user of a client device may request additional information for a particular data point 542 on the graphs.

E. Environment Size Trend Graphs

Figure 22:
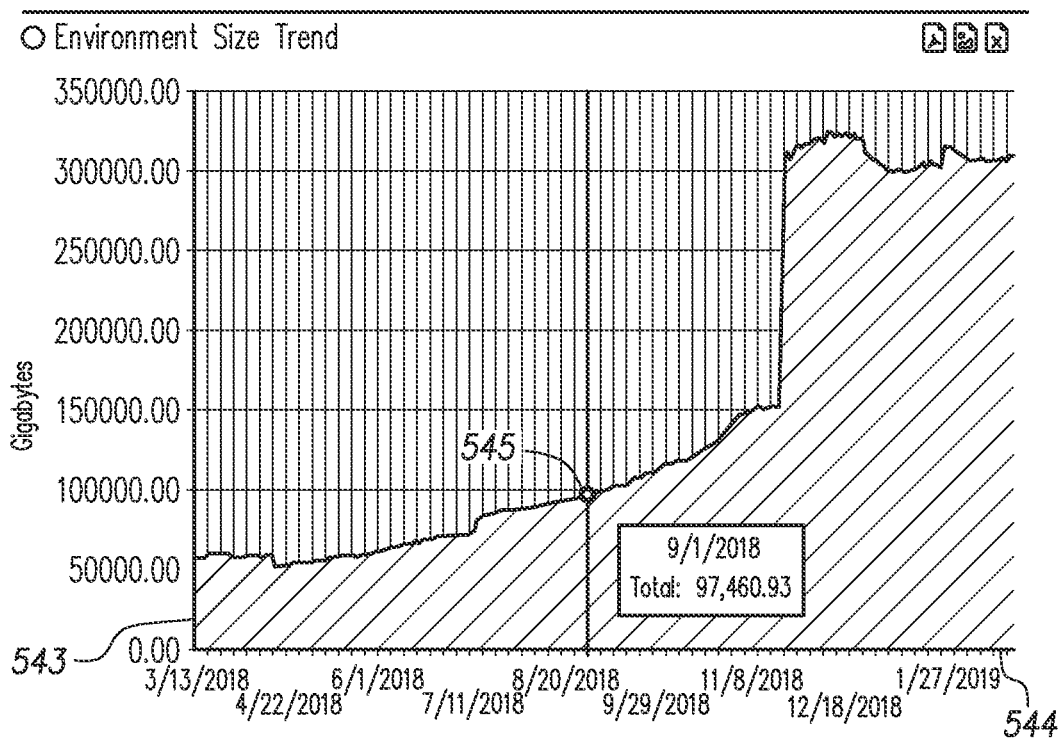
FIG. 22 is an example graph depicting environment size trend data.

FIG. 22 is an example graph depicting environment size trend data. This graph shows a relationship between a size of the environment (a Y axis 543) being reviewed and a time and date range (a X axis 544). For example, for a given data point 545 in the graph, one can determine a total size of the environment related documents reviewed by reviewers by a given date and time corresponding to pint 545.

F. Indexes Size Trend Graphs

Figure 23:
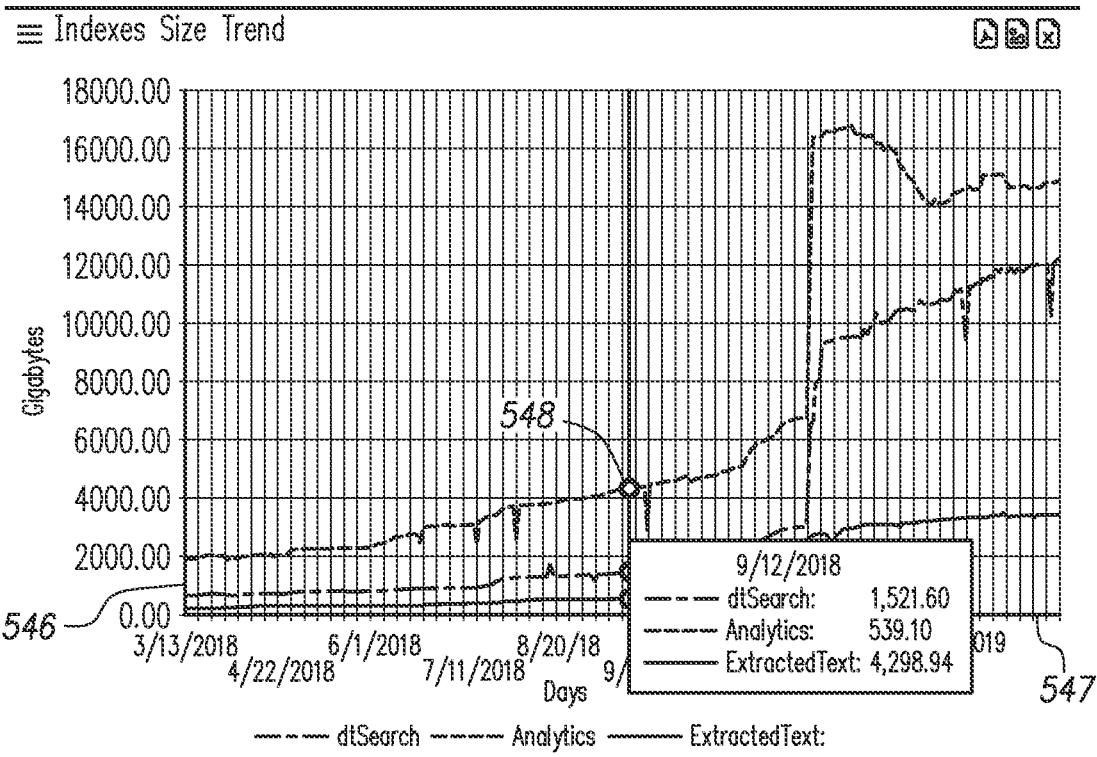
FIG. 23 is an example graph depicting indexes size trend data.

FIG. 23 is an example graph depicting indexes size trend data. The graph may include several plots such as a data research plot, an analytics plot, an extracted text plot, and so forth. The plots are two-dimensional plots where a Y axis 546 indicates gigabytes of data, and a X axis 547 indicates time and date ranges. As in previous examples, a user of a client device may request additional data for a particular data point 548 shown in the graph.

G. Database Size Trend Graphs

Figure 24:
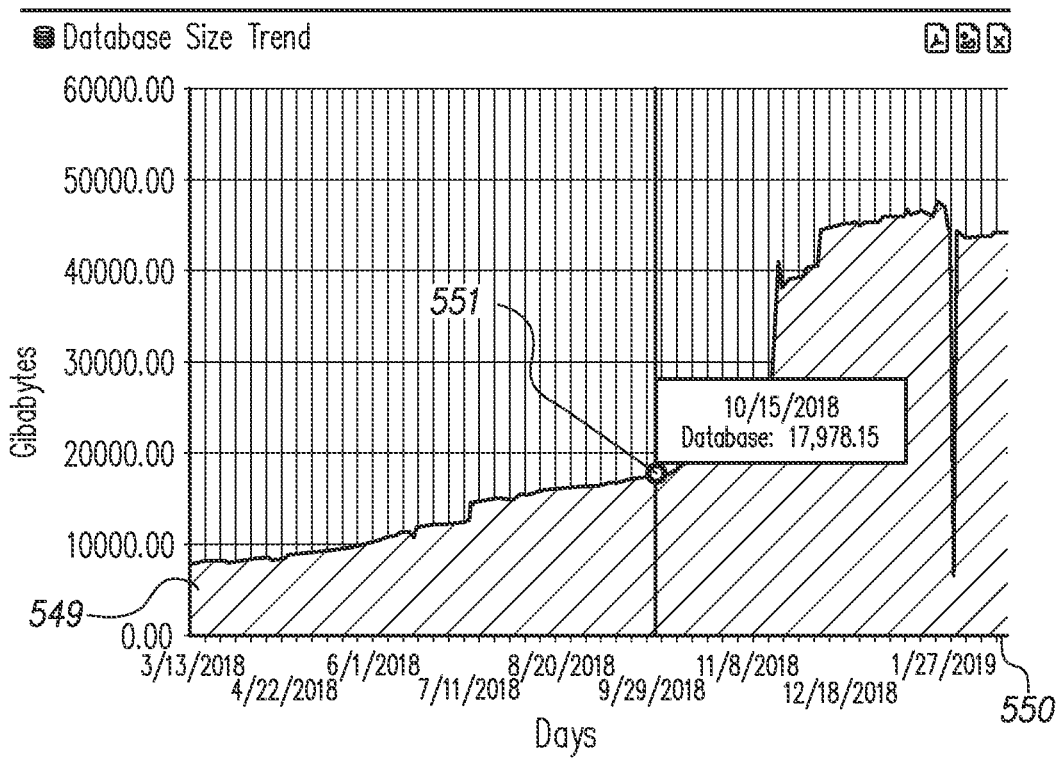
FIG. 24 is an example graph depicting database size trend data.

FIG. 24 is an example graph depicting database size trend data. The depicted graph is a two-dimensional graph labeled by gigabytes (a Y axis 549) for reviewed data and a time and date range (a X axis 550). For a given data point 551 on the graph, one can determine a date associated with that point and a storage space of the database that was used to store the reviewed document up to that date.

H. Modified Indexes Size Trend Graphs

Figure 25:
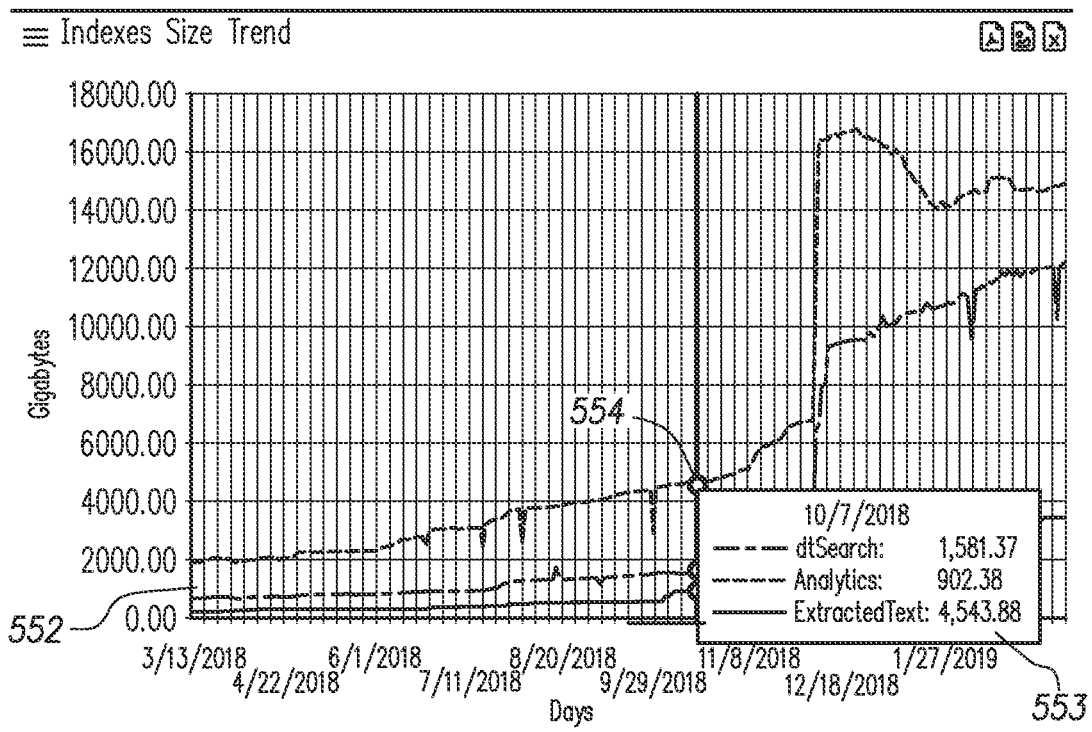
FIG. 25 is an example graph depicting modified indexes size trend data.

FIG. 25 is an example graph depicting modified indexes size trend data. FIG. 25 depicts three plots. A first plot is for a data search, a second plot is for analytics, and a third plot is for extracted text data. The plots show relationships between gigabytes of sizes (a Y axis 552) of reviewed data and time and date ranges (a X axis 553). For a given data point 554 on the graph, one can determine additional data for data point 554.

I. Modified Environment Size Trend Graphs

Figure 26:
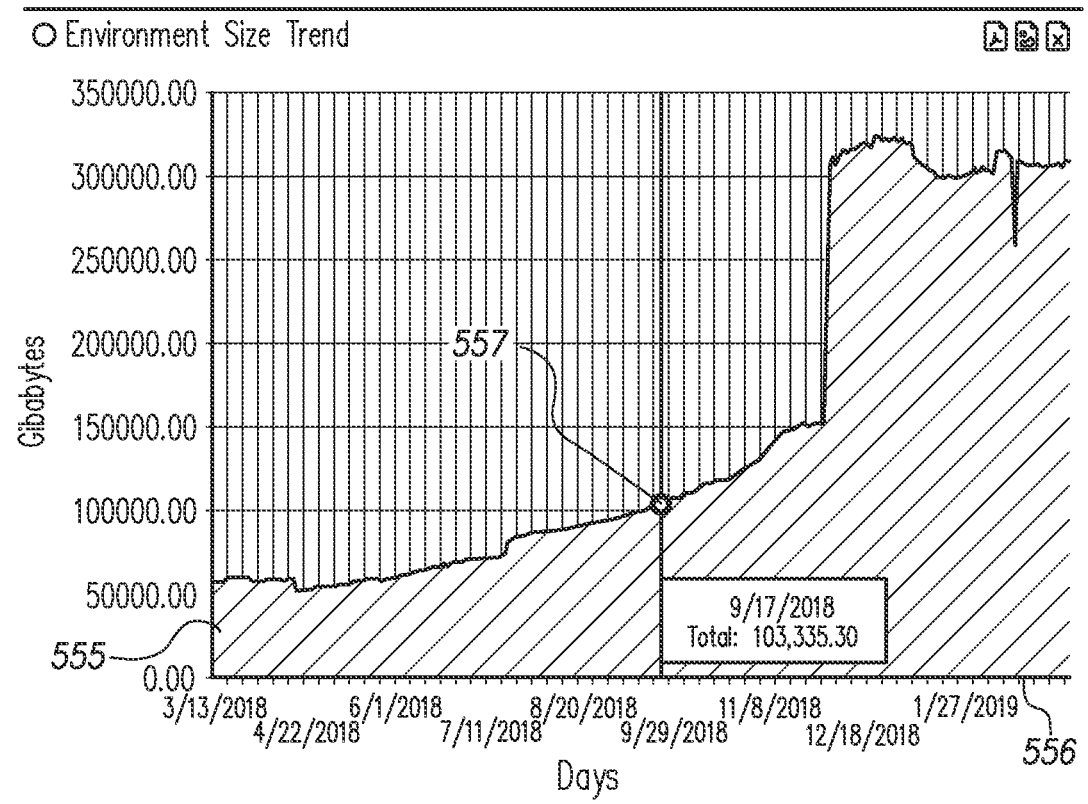
FIG. 26 is an example graph depicting modified environment size trend data.

FIG. 26 is an example graph depicting modified indexes size trend data. FIG. 26 is an example chart showing a relationship between environment sizes (a Y axis 555) measured in gigabytes and time and date ranges (a X axis 556) during which the documents are reviewed. For a given data point 557 on the graph, one may obtain an information pertaining to the total amount of size of reviewed data on a given date and at a given time.

J. Modified Indexes Size Trend Graphs

Figure 27:
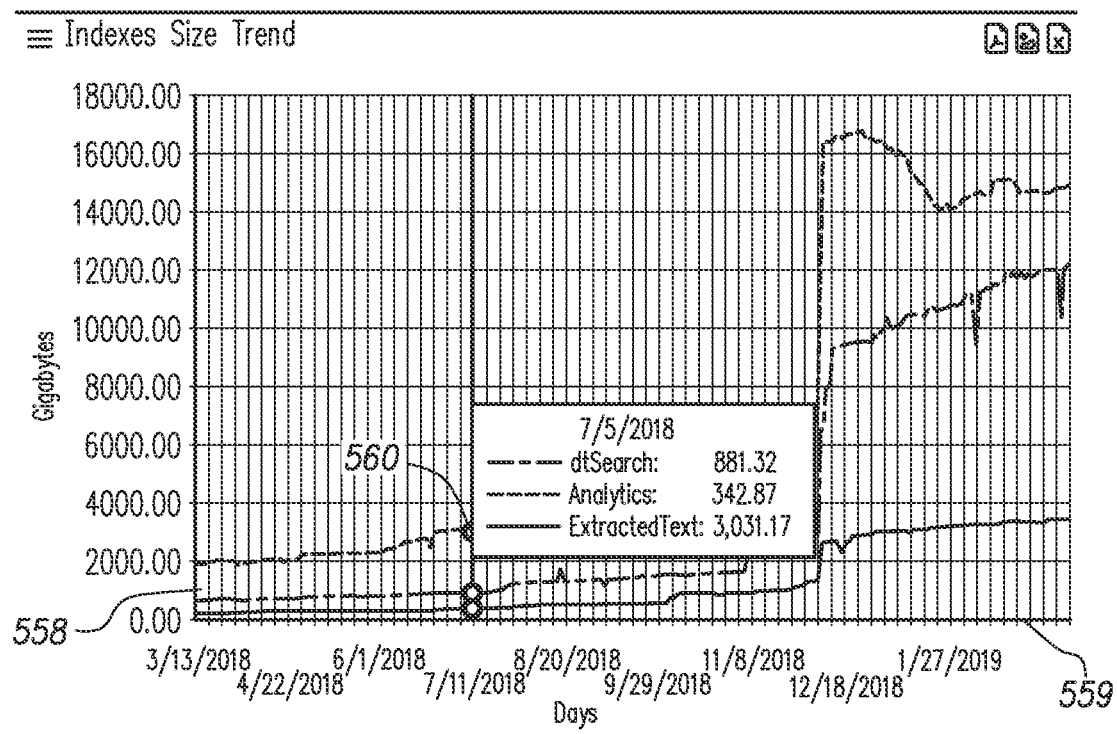
FIG. 27 is an example graph depicting modified indexes size trend data.

FIG. 27 is an example graph depicting modified indexes size trend data. FIG. 27 is an example graph that depicts modified indexes size trends. It is similar to FIG. 23, however, it shows different relationships for each of the graphs including a data search graph, an analytics graph, and an extracted text graph. The trends are plotted along a Y axis 558 and a X axis 559. As in previous examples, a user of a client device may request additional data for a particular data point 560 shown in the graph.

K. Modified Database Size Trend Graphs

Figure 28:
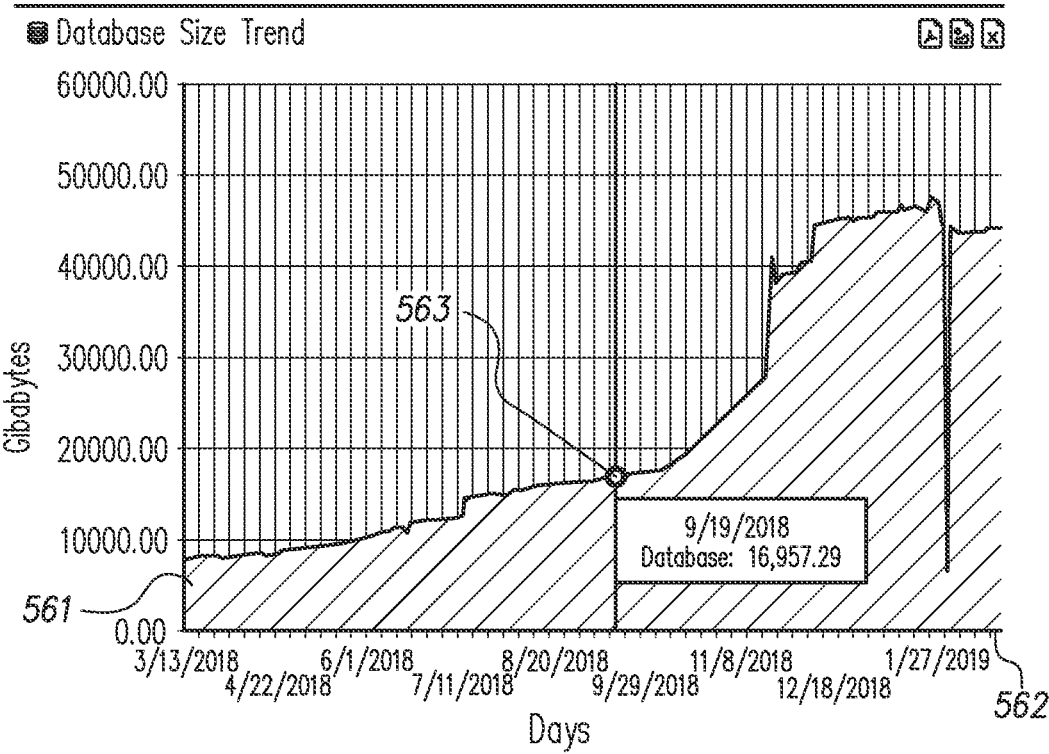
FIG. 28 is an example graph depicting modified database size trend data.

FIG. 28 is an example graph depicting modified database size trend data. Graphs in FIG. 28 are similar to the graphs depicted in FIG. 24. However, relationships between counts (a Y axis 561) of the gigabytes corresponding to sizes of data reviewed by reviewers on a given date or within a given time range (a X axis 562) are different than in the previous figures. As in previous examples, a user of a client device may request additional data for a particular data point 563 shown in the graph.

L. Document Growth Trend Graphs

Figure 29:
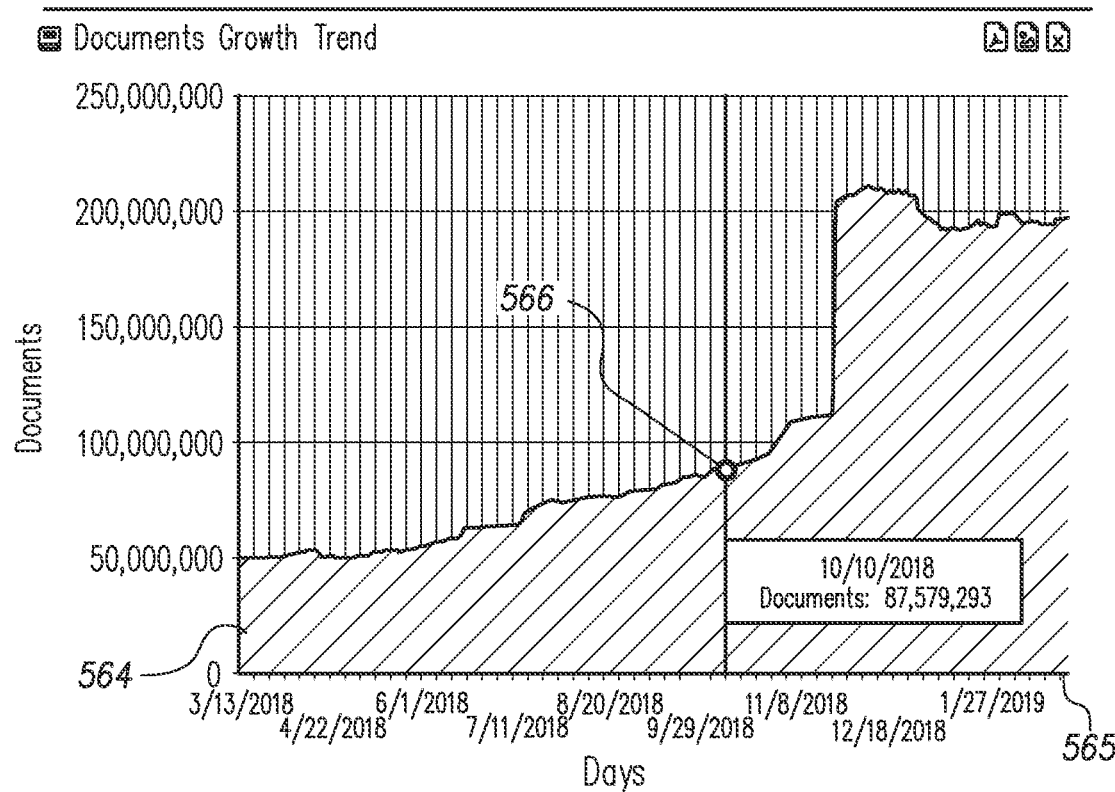
FIG. 29 is an example graph depicting document growth trend data.

FIG. 29 is an example graph depicting document growth trend data. In the depicted graph, each data point corresponds to, or represents, a relationship between a count (a Y axis 564) of documents reviewed by reviewers by a particular date (a X axis 565). As in previous examples, a user of a client device may request additional data for a particular data point 566 shown in the graph.

M. Natives Trend Graphs

Figure 30:
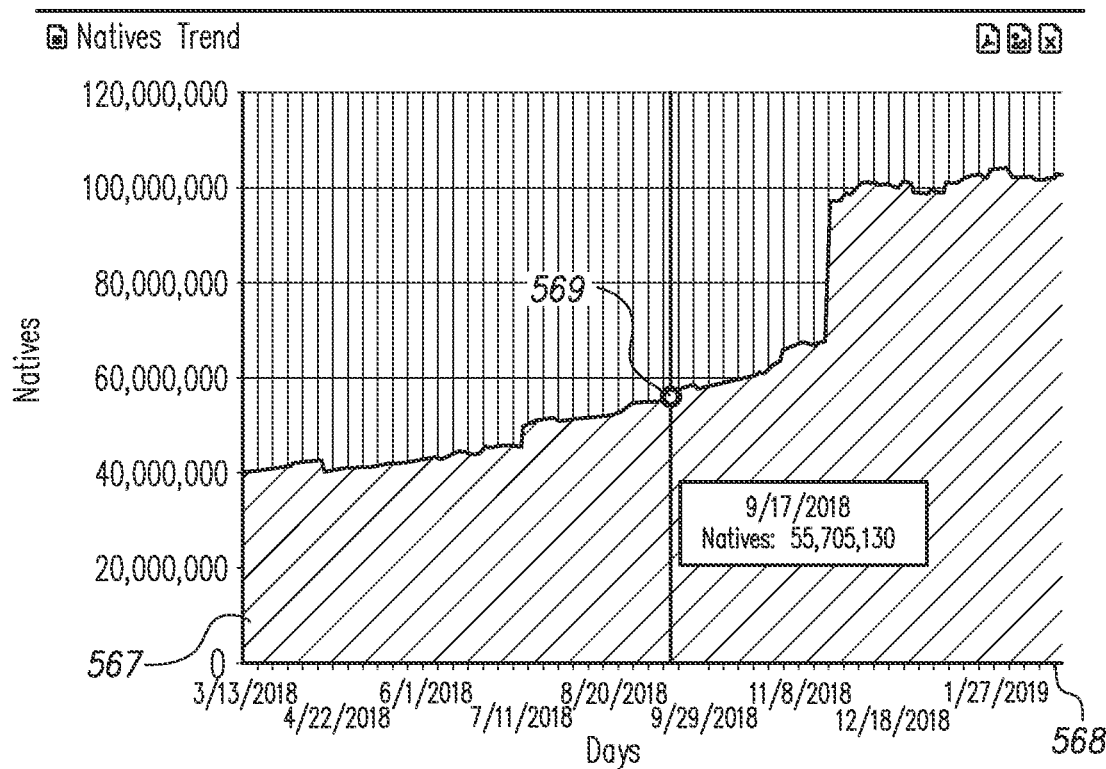
FIG. 30 is an example graph depicting natives trend data.

FIG. 30 is an example graph depicting natives trend data. A native document is a document that is in its original, non-translated, not converted version or format. FIG. 30 is an example graph depicting a relationship between native trends (a Y axis 567) and time and date ranges (a X axis 568). In the graph depicted in FIG. 30, each point in the graph represents a relationship between a count of native documents reviewed by a particular time and date. As in previous examples, a user of a client device may request additional data for a particular data point 569 shown in the graph.

N. Files Growth Trend Graphs

Figure 31:
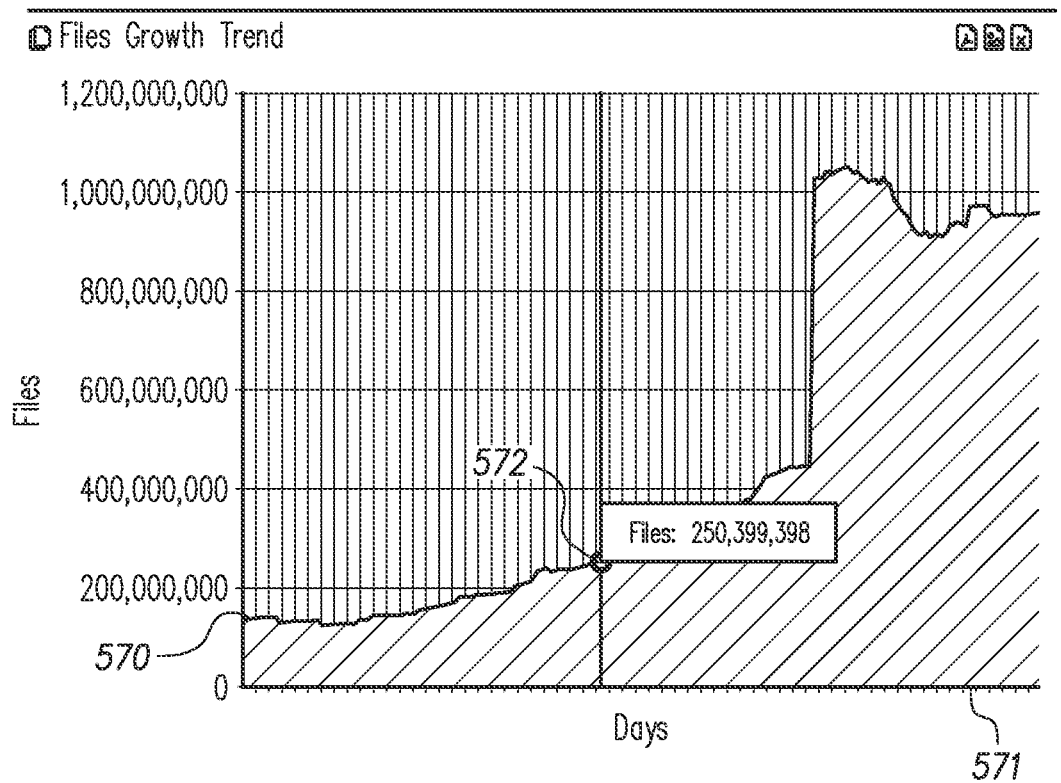
FIG. 31 is an example graph depicting files growth trend data.

FIG. 31 is an example graph depicting files growth trend data. The depicted graph shows a relationship between a count (a Y axis 570) of files that are being reviewed or have been reviewed and a time range (a X axis 571). A given data point 572 on the graph represents a relationship between a total count of files reviewed by the given date.

O. Top Workspaces Pie-Charts

Figure 32:
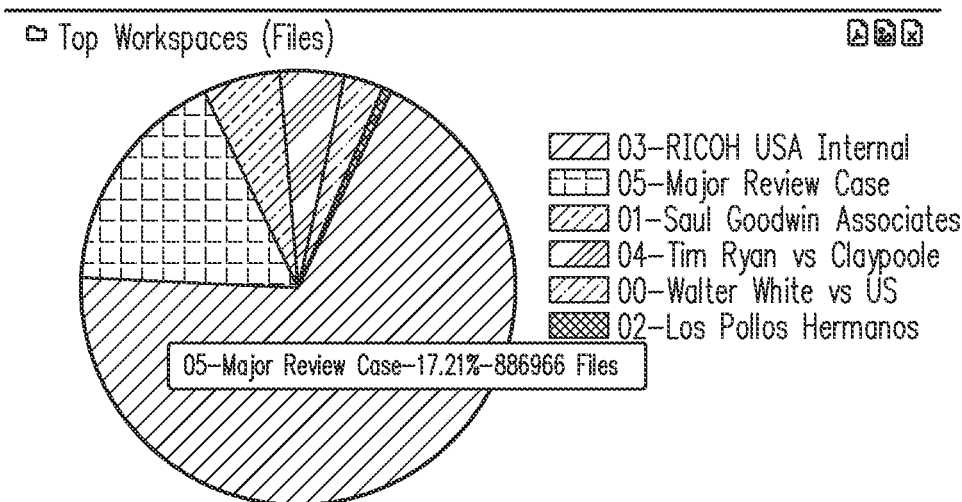
FIG. 32 is an example pie-chart depicting top workspaces files data.

FIG. 32 is an example pie-chart depicting top workspaces files data. The depicted pie-chart shows relative counts of files reviewed by reviewers and pertaining to different matters. Hence, each different piece of the pie-chart corresponds to a different workspace. Examples of workspaces may include different matters, different cases, different law suits, different projects, and so forth. As in previous examples, a user of a client device may point into any point on the pie-chart and obtain additional information for the selected point. As in previous examples, a user of a client device may point into any point on the pie-chart and obtain additional information for the selected point.

P. Top Workspaces-Databases Pie-Charts

Figure 33:
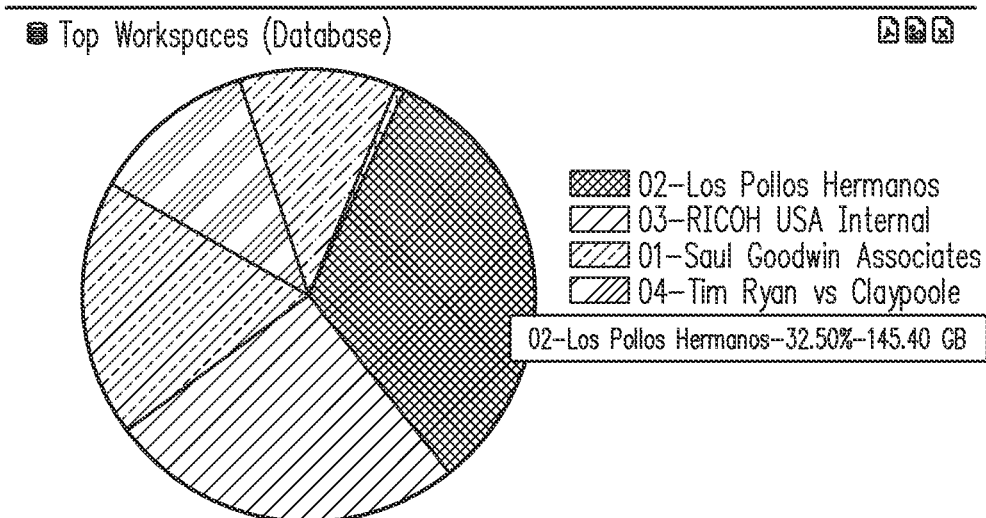
FIG. 33 is an example pie-chart depicting top workspaces-databases data.

FIG. 33 is an example pie-chart depicting top workspaces-databases data. The depicted pie-chart shows a relationship of the database usage between different matters and different workspaces. As in previous examples, a user of a client device may point into any point on the pie-chart and obtain additional information for the selected point.

Q. Top Workspaces Size Pie-Charts

Figure 34:
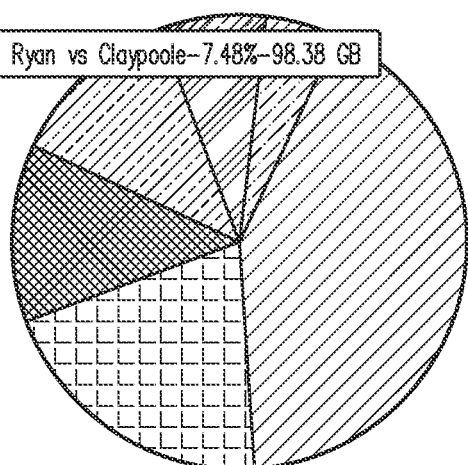
FIG. 34 is an example pie-chart depicting top workspaces sizes data.

FIG. 34 is an example pie-chart depicting top workspaces sizes data. Each pie-chart piece depicted in the pie-chart corresponds to a different matter and represents a relative size of the workspace-database space that is being used or dedicated to the particular matter. As in previous examples, a user of a client device may point into any point on the pie-chart and obtain additional information for the selected point.

R. Modified Top Workspaces-Databases Pie-Charts

Figure 35:
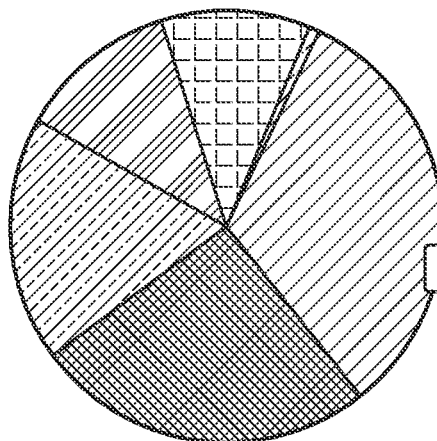
FIG. 35 is an example pie-chart depicting top workspaces-databases data.

FIG. 35 is an example pie-chart depicting top workspaces-databases data. In the depicted pie-chart, each of the pie-chart pieces corresponds to a different matter and shows a relative percentage of the database space that is dedicated to that matter. As in previous examples, a user of a client device may point into any point on the pie-chart and obtain additional information for the selected point.

S. Daily Statistics Graphs

Figure 36:
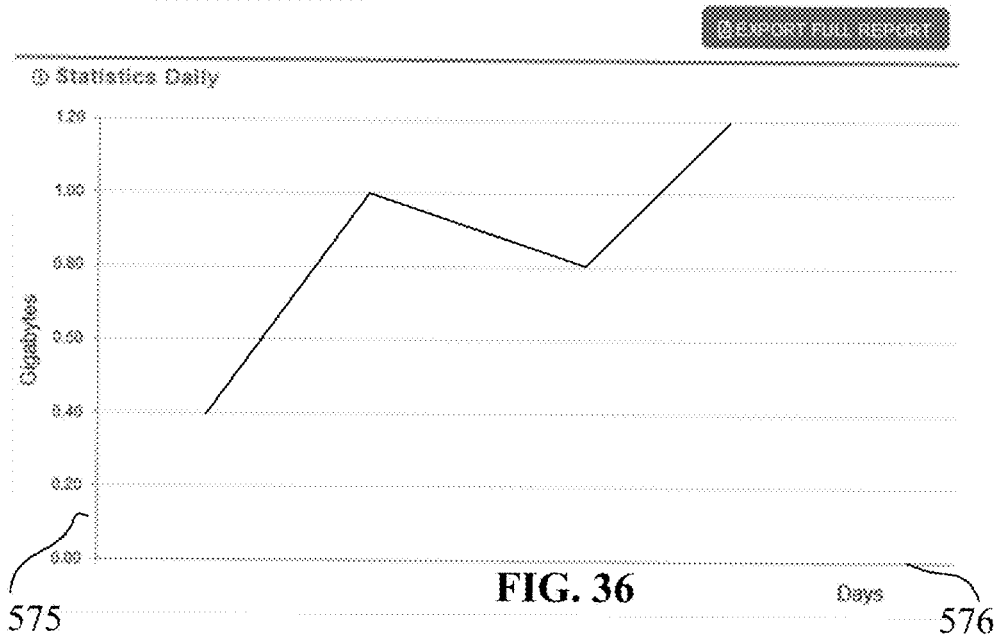
FIG. 36 is an example graph depicting daily statistics data.

FIG. 36 is an example graph depicting daily statistics data. The graph shown in FIG. 36 depicts a relationship between a size of data (a Y axis 575) reviewed on a given date (a X axis 576). The relationship may be exported in any type of output files and additional information for the report may also be obtained. As in previous examples, a user of a client device may point into any point on the graph and obtain additional information for the selected point.

T. Monthly Statistics Graphs

Figure 37:
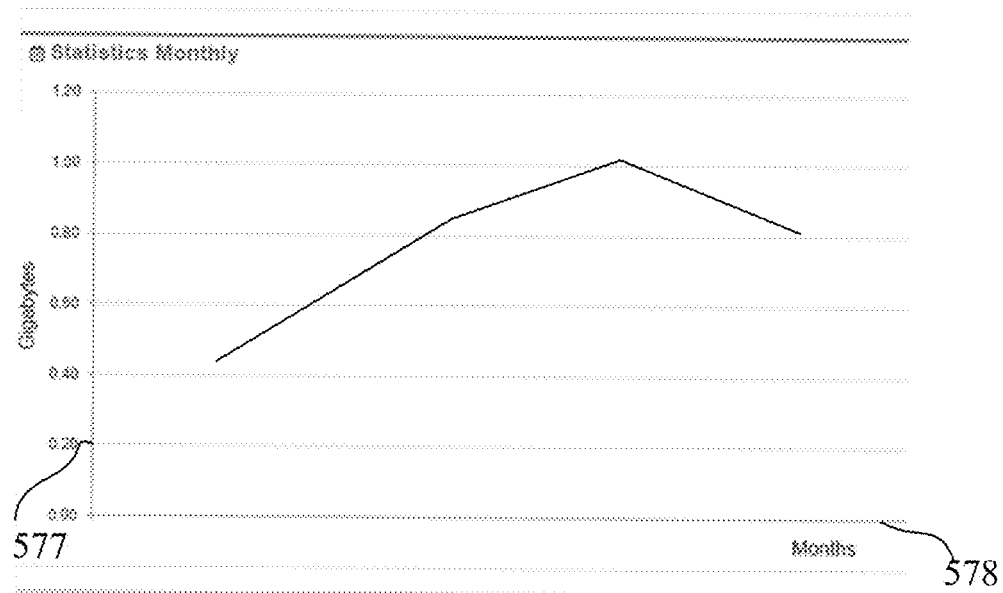
FIG. 37 is an example graph depicting monthly statistics data.

FIG. 37 is an example graph depicting monthly statistics data. The graph shown in FIG. 37 depicts statistical data organized per months. As in previous examples, a user of a client device may point into any point on the graph and obtain additional information for the selected point.

U. Executive Summary Graphs

Figure 38:
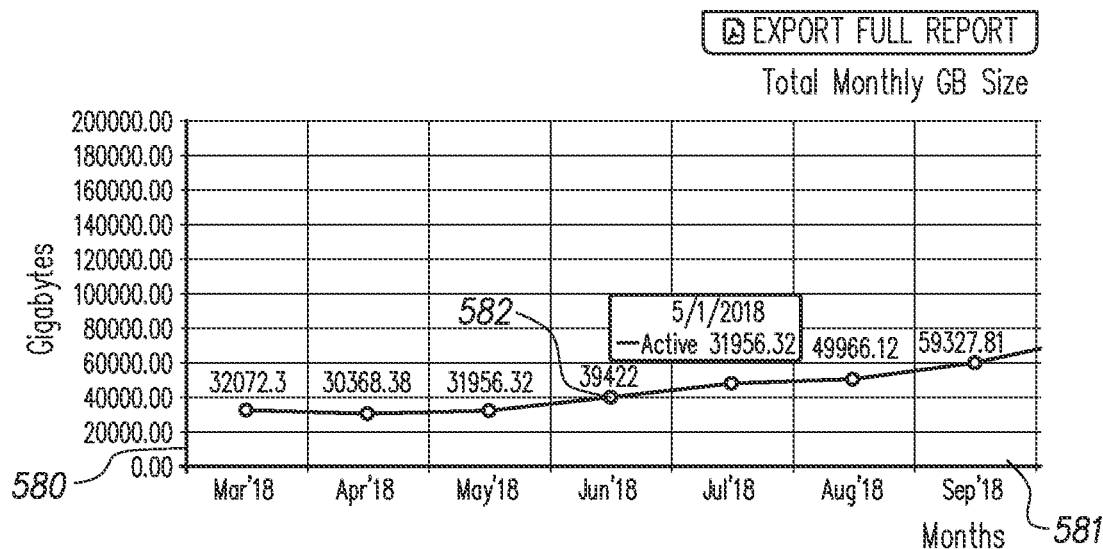
FIG. 38 is an example executive summary graph.

FIG. 38 is an example executive summary graph. The depicted executive summary graph shows a relationship between amounts (a Y axis 580) of data that has been reviewed at a given date (a X axis 581). As shown in FIG. 38, the summary graph plots the amounts of reviewed documents on a per monthly basis. Upon selecting a data point 582 on the graph, a user of a client device may obtain additional information such a data associated with the selected data point, and a count of active documents that are being reviewed on a given date, and so forth.

V. Executive Summary Bar-Graphs

Figure 39:
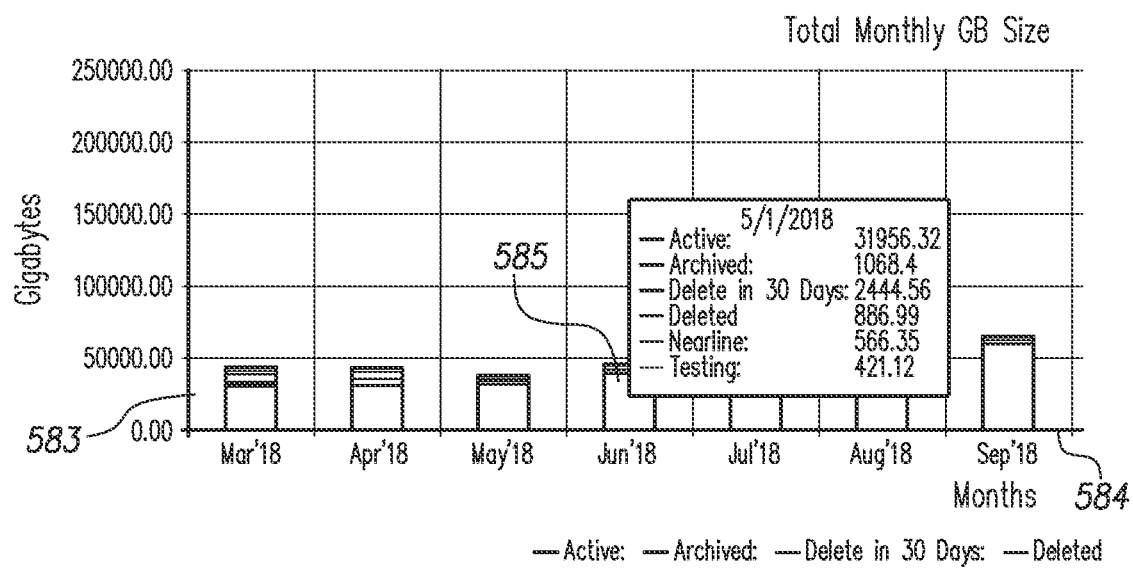
FIG. 39 is an example executive summary bar-graph.

FIG. 39 is an example executive summary bar-graph. In the depicted bar-graph, each portion of a bar corresponds to a different type of documents. For example, one bar may include bar-portions that correspond to active reviewed document, archived document, deleted documents, documents deleted within 30 days, nearline documents, and testing documents, respectively. Upon selecting a data point 585 on the two-dimensional graph having a Y axis 583 and a X axis 584, a user of a client device may obtain additional information such a data associated with the selected data point, and a count of active/archived/deleted/nearline/testing documents for a given date.

VIII. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 40:
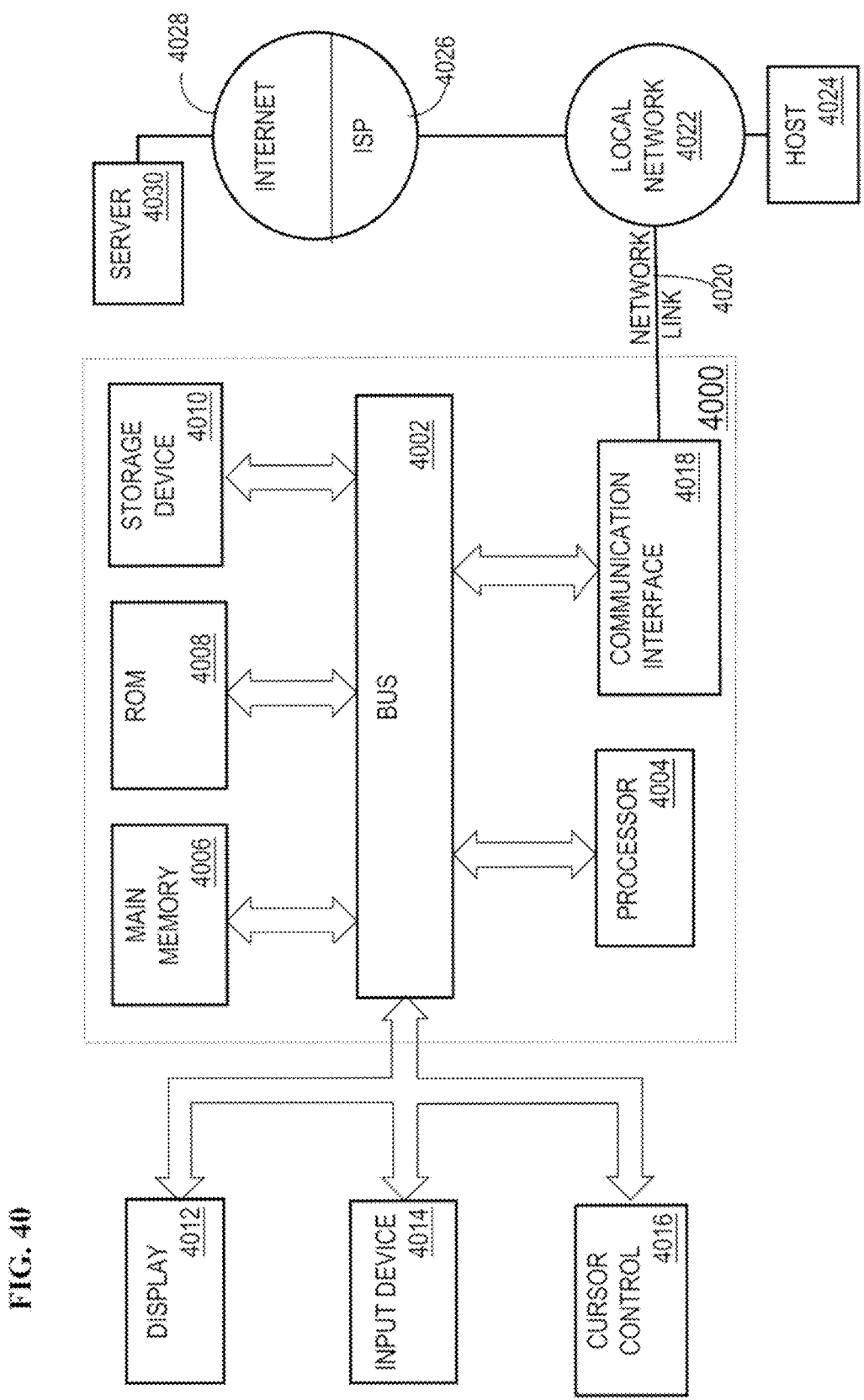
FIG. 40 is a block diagram of a computer system on which embodiments of the approach may be implemented.

FIG. 40 is a block diagram that depicts an example computer system 4000 upon which embodiments may be implemented. Computer system 4000 includes a bus 4002 or other communication mechanism for communicating information, and a processor 4004 coupled with bus 4002 for processing information. Computer system 4000 also includes a main memory 4006, such as a random-access memory (RAM) or other dynamic storage device, coupled to bus 4002 for storing information and instructions to be executed by processor 4004. Main memory 4006 also may be used for storing temporary variables or other intermediate information during execution of instructions to be executed by processor 4004. Computer system 4000 further includes a read only memory (ROM) 4008 or other static storage device coupled to bus 4002 for storing static information and instructions for processor 4004. A storage device 4010, such as a magnetic disk or optical disk, is provided and coupled to bus 4002 for storing information and instructions.

Computer system 4000 may be coupled via bus 4002 to a display 4012, such as a cathode ray tube (CRT), for displaying information to a computer user. Although bus 4002 is illustrated as a single bus, bus 4002 may comprise one or more buses. For example, bus 4002 may include without limitation a control bus by which processor 4004 controls other devices within computer system 4000, an address bus by which processor 4004 specifies memory locations of instructions for execution, or any other type of bus for transferring data or signals between components of computer system 4000.

An input device 4014, including alphanumeric and other keys, is coupled to bus 4002 for communicating information and command selections to processor 4004. Another type of user input device is cursor control 4016, such as a mouse, a trackball, or cursor direction keys for communicating direction information and command selections to processor 4004 and for controlling cursor movement on display 4012. This input device typically has two degrees of freedom in two axes, a first axis (e.g., x) and a second axis (e.g., y), that allows the device to specify positions in a plane.

Computer system 4000 may implement the techniques described herein using customized hard-wired logic, one or more ASICs or FPGAs, firmware and/or program logic or computer software which, in combination with the computer system, causes or programs computer system 4000 to be a special-purpose machine. According to one embodiment, those techniques are performed by computer system 4000 in response to processor 4004 executing one or more sequences of one or more instructions contained in main memory 4006. Such instructions may be read into main memory 4006 from another computer-readable medium, such as storage device 4010. Execution of the sequences of instructions contained in main memory 4006 causes processor 4004 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 4000, various computer-readable media are involved, for example, in providing instructions to processor 4004 for execution. Such a medium may take many forms, including but not limited to, non-volatile media and volatile media. Non-volatile media includes, for example, optical or magnetic disks, such as storage device 4010. Volatile media includes dynamic memory, such as main memory 4006. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 4004 for execution. For example, the instructions may initially be carried on a magnetic disk of a remote computer. The remote computer can load the instructions into its dynamic memory and send the instructions over a telephone line using a modem. A modem local to computer system 4000 can receive the data on the telephone line and use an infra-red transmitter to convert the data to an infra-red signal. An infra-red detector can receive the data carried in the infra-red signal and appropriate circuitry can place the data on bus 4002. Bus 4002 carries the data to main memory 4006, from which processor 4004 retrieves and executes the instructions. The instructions received by main memory 4006 may optionally be stored on storage device 4010 either before or after execution by processor 4004.

Computer system 4000 also includes a communication interface 4018 coupled to bus 4002. Communication interface 4018 provides a two-way data communication coupling to a network link 4020 that is connected to a local network 4022. For example, communication interface 4018 may be an integrated service digital network (ISDN) card or a modem to provide a data communication connection to a corresponding type of telephone line. As another example, communication interface 4018 may be a local area network (LAN) card to provide a data communication connection to a compatible LAN. Wireless links may also be implemented. In any such implementation, communication interface 4018 sends and receives electrical, electromagnetic or optical signals that carry digital data streams representing various types of information.

Network link 4020 typically provides data communication through one or more networks to other data devices. For example, network link 4020 may provide a connection through local network 4022 to a host computer 4024 or to data equipment operated by an Internet Service Provider (ISP) 4026. ISP 4026 in turn provides data communication services through the world-wide packet data communication network now commonly referred to as the "Internet" 4028. Local network 4022 and Internet 4028 both use electrical, electromagnetic or optical signals that carry digital data streams.

Computer system 4000 can send messages and receive data, including program code, through the network(s), network link 4020 and communication interface 4018. In the Internet example, a server 4030 might transmit a requested code for an application program through Internet 4028, ISP 4026, local network 4022 and communication interface 4018. The received code may be executed by processor 4004 as it is received, and/or stored in storage device 4010, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media storing instructions which, when processed by one or more computer processors, cause:
receiving, by a data access system, a request for data, wherein the request specifies one or more project workspaces to which the request for data pertains, and wherein the request specifies that for each project workspace, of the one or more project workspaces, a count of files reviewed in that project workspace is to be provided and a relative size of that project workspace is to be provided;
wherein a project workspace, of one or more project workspaces, is allocated by the data access system based on the provided count of files to be reviewed in that project workspace and based on the size of the project workspace to be provided for reviewing corresponding files;
parsing the request to determine the one or more project workspaces to which the request pertains;
determining the data for the request for the one or more project workspaces;
for each project workspace of the one or more project workspaces:
determining particular data that is requested by the request for that project workspace;
determining a count of files reviewed in that project workspace and a relative size of that project workspace; and
transmitting the particular data, the count of files reviewed in that project workspace, and the relative size of that project workspace to a client device to cause the client device to generate a graphical user interface and display the particular data using the graphical user interface and organized by the project workspace;
determining whether a project workspace, of the one or more project workspaces, has been selected;
in response to determining that a project workspace, of the one or more project workspaces, has been selected:
determining, based on the selected project workspace, an identifier of the selected project workspace, a name of the selected project workspace, a corresponding relative size of the selected project workspace, and a corresponding count of files in the selected project workspace;
causing displaying, as an overlay over the particular data, the identifier of the selected project workspace, the name of the selected project workspace, the corresponding relative size of the selected project workspace, and the corresponding count of files in the selected project workspace.

2. The one or more non-transitory computer-readable media of claim 1, wherein upon receiving the particular data, the client device uses the graphical user interface to generate one or more graphs based on the particular data and causes displaying the one or more graphs on a computer display of the client device.

3. The one or more non-transitory computer-readable media of claim 2, wherein the particular data includes one or more of:
review progress summaries that include one or more of: a document review progress summary, a document review ratio per reviewer, a total count of documents reviewed by reviewers, a count of documents reviewed hourly, an average native document size review rate, a total native document size review ratio, or a total text document reviewed size;
review analysis reports that include one or more of: a reviewed document count report, a document review rate report, a text review rate report, a native review rate report, or a total native summary report;
review analysis summary reports that include one or more of: a session report per session identifiers, a session-start-and-end report per session identifiers, a session error report per session identifiers, a user artifacts report, a reviewer full name report, a reviewer email address report, or a case artifact report; or
review analysis job reports that include one or more of: a summary of active jobs, a summary of completed jobs, a summary of deleted jobs, or a summary of suspended jobs.

4. The one or more non-transitory computer-readable media of claim 3, wherein the particular data includes one or more of:
global trend reports that include one or more of: a global trend summary per environment identifiers, a global trend summary with start and end dates, a global file size trend summary, an environment size trend summary, an index size trend summary, a database size trend summary, a document growth trend summary, a nave trend summary, an image trend summary, a production image trend summary, a file growth trend summary, or a workspace growth trend summary;
statistical reports that include one or more of: a daily statistics report, a monthly statistics report, or a top workspaces documents report; or
executive summary reports that include one or more of: a one-line summary of monthly total sizes of reviewed document report, an active document report, an archived document report, a deleted document report, a nearline document report, or a testing document report.

5. The one or more non-transitory computer-readable media of claim 4, storing additional instructions which, when processed by the one or more computer processors, cause:
receiving, by the data access system, a data-specific request;
parsing, by the data access system, the data-specific request to identify a particular data point included in the particular data;
determining additional data for the particular data point; and
transmitting the additional data associated with the particular data point to the client device to cause the client device to update the graphical user interface and display at least the additional data.

6. The one or more non-transitory computer-readable media of claim 5, wherein the data-specific request is generated at the client device upon selecting, using a pointer pointing to a particular graph of one or more graphs displayed using the graphical user interface, the particular data point included in the particular graph; and
wherein upon selecting the particular data point in the particular graph, the particular data point is graphically represented as selected.

7. The one or more non-transitory computer-readable media of claim 6, storing additional instruction which, when processed by the one or more computer processors, cause:
in response to receiving the request for the data:
determining whether the data is stored at the data access system;

in response to determining that the data is stored at the data access system, accessing, by the data access system, the data for a storage unit of the data access system;

in response to determining that the data is not stored at the data access system, retrieving the data from the document review and reporting system; and wherein the document review and reporting system is separate from the data access system.

8. An apparatus comprising:
one or more computer processors; and
one or more memories storing instructions which, when processed by the one or more computer processors, cause:

receiving, by a data access system, a request for data, wherein the request specifies one or more project workspaces to which the request for data pertains, and wherein the request specifies that for each project workspace, of the one or more project workspaces, a count of files reviewed in that project workspace is to be provided and a relative size of that project workspace is to be provided;

wherein a project workspace, of one or more project workspaces, is allocated by the data access system based on the provided count of files to be reviewed in that project workspace and based on the size of the project workspace to be provided for reviewing corresponding files;

parsing the request to determine the one or more project workspaces to which the request pertains;

determining the data for the request for the one or more project workspaces;

for each project workspace of the one or more project workspaces:
  determining particular data that is requested by the request for that project workspace;
  determining a count of files reviewed in that project workspace and a relative size of that project workspace; and
  transmitting the particular data, the count of files reviewed in that project workspace, and the relative size of that project workspace to a client device to cause the client device to generate a graphical user interface and display the particular data using the graphical user interface and organized by the project workspace;

determining whether a project workspace, of the one or more project workspaces, has been selected;

in response to determining that a project workspace, of the one or more project workspaces, has been selected:
  determining, based on the selected project workspace, an identifier of the selected project workspace, a name of the selected project workspace, a corresponding relative size of the selected project workspace, and a corresponding count of files in the selected project workspace;
  causing displaying, as an overlay over the particular data, the identifier of the selected project workspace, the name of the selected project workspace, the corresponding relative size of the selected project workspace, and the corresponding count of files in the selected project workspace.

9. The apparatus of claim 8, wherein upon receiving the particular data, the client device uses the graphical user interface to generate one or more graphs based on the particular data and causes displaying the one or more graphs on a computer display of the client device.

10. The apparatus of claim 9, wherein the particular data includes one or more of:
  review progress summaries that include one or more of: a document review progress summary, a document review ratio per reviewer, a total count of documents reviewed by reviewers, a count of documents reviewed hourly, an average native document size review rate, a total native document size review ratio, or a total text document reviewed size;
  review analysis reports that include one or more of: a reviewed document count report, a document review rate report, a text review rate report, a native review rate report, or a total native summary report;
  review analysis summary reports that include one or more of: a session report per session identifiers, a session-start-and-end report per session identifiers, a session error report per session identifiers, a user artifacts report, a reviewer full name report, a reviewer email address report, or a case artifact report; or
  review analysis job reports that include one or more of: a summary of active jobs, a summary of completed jobs, a summary of deleted jobs, or a summary of suspended jobs.

11. The apparatus of claim 10, wherein the particular data includes one or more of:
  global trend reports that include one or more of: a global trend summary per environment identifiers, a global trend summary with start and end dates, a global file size trend summary, an environment size trend summary, an index size trend summary, a database size trend summary, a document growth trend summary, a nave trend summary, an image trend summary, a production image trend summary, a file growth trend summary, or a workspace growth trend summary;
  statistical reports that include one or more of: a daily statistics report, a monthly statistics report, or a top workspaces documents report; or
  executive summary reports that include one or more of: a one-line summary of monthly total sizes of reviewed document report, an active document report, an archived document report, a deleted document report, a nearline document report, or a testing document report.

12. The apparatus of claim 11, storing additional instructions which, when processed by the one or more computer processors, cause:
  receiving, by the data access system, a data-specific request;
  parsing, by the data access system, the data-specific request to identify a particular data point included in the particular data;
  determining additional data for the particular data point; and
  transmitting the additional data associated with the particular data point to the client device to cause the client device to update the graphical user interface and display at least the additional data.

13. The apparatus of claim 12, wherein the data-specific request is generated at the client device upon selecting, using a pointer pointing to a particular graph of one or more graphs displayed using the graphical user interface, the particular data point included in the particular graph; and
  wherein upon selecting the particular data point in the particular graph, the particular data point is graphically represented as selected.

14. The apparatus of claim 13, storing additional instruction which, when processed by the one or more computer processors, cause:

in response to receiving the request for the data:
  determining whether the data is stored at the data access system;
  in response to determining that the data is stored at the data access system, accessing, by the data access system, the data for a storage unit of the data access system;
  in response to determining that the data is not stored at the data access system, retrieving the data from the document review and reporting system; and
  wherein the document review and reporting system is separate from the data access system.

15. A computer-implemented method comprising:
receiving, by a data access system, a request for data, wherein the request specifies one or more project workspaces to which the request for data pertains, and wherein the request specifies that for each project workspace, of the one or more project workspaces, a count of files reviewed in that project workspace is to be provided and a relative size of that project workspace is to be provided;
wherein a project workspace, of one or more project workspaces, is allocated by the data access system based on the provided count of files to be reviewed in that project workspace and based on the size of the project workspace to be provided for reviewing corresponding files;
parsing the request to determine the one or more project workspaces to which the request pertains;
determining the data for the request for the one or more project workspaces;
for each project workspace of the one or more project workspaces:
  determining particular data that is requested by the request for that project workspace;
  determining a count of files reviewed in that project workspace and a relative size of that project workspace; and
  transmitting the particular data, the count of files reviewed in that project workspace, and the relative size of that project workspace to a client device to cause the client device to generate a graphical user interface and display the particular data using the graphical user interface and organized by the project workspace;
determining whether a project workspace, of the one or more project workspaces, has been selected;
in response to determining that a project workspace, of the one or more project workspaces, has been selected:
  determining, based on the selected project workspace, an identifier of the selected project workspace, a name of the selected project workspace, a corresponding relative size of the selected project workspace, and a corresponding count of files in the selected project workspace;
  causing displaying, as an overlay over the particular data, the identifier of the selected project workspace, the name of the selected project workspace, the corresponding relative size of the selected project workspace, and the corresponding count of files in the selected project workspace.

16. The computer-implemented method of claim 15, wherein upon receiving the particular data, the client device uses the graphical user interface to generate one or more graphs based on the particular data and causes displaying the one or more graphs on a computer display of the client device.

17. The computer-implemented method of claim 16, wherein the particular data includes one or more of:
  review progress summaries that include one or more of: a document review progress summary, a document review ratio per reviewer, a total count of documents reviewed by reviewers, a count of documents reviewed hourly, an average native document size review rate, a total native document size review ratio, or a total text document reviewed size;
  review analysis reports that include one or more of: a reviewed document count report, a document review rate report, a text review rate report, a native review rate report, or a total native summary report;
  review analysis summary reports that include one or more of: a session report per session identifiers, a session-start-and-end report per session identifiers, a session error report per session identifiers, a user artifacts report, a reviewer full name report, a reviewer email address report, or a case artifact report; or
  review analysis job reports that include one or more of: a summary of active jobs, a summary of completed jobs, a summary of deleted jobs, or a summary of suspended jobs.

18. The computer-implemented method of claim 17, wherein the particular data includes one or more of:
  global trend reports that include one or more of: a global trend summary per environment identifiers, a global trend summary with start and end dates, a global file size trend summary, an environment size trend summary, an index size trend summary, a database size trend summary, a document growth trend summary, a naïve trend summary, an image trend summary, a production image trend summary, a file growth trend summary, or a workspace growth trend summary;
  statistical reports that include one or more of: a daily statistics report, a monthly statistics report, or a top workspaces documents report; or
  executive summary reports that include one or more of: a one-line summary of monthly total sizes of reviewed document report, an active document report, an archived document report, a deleted document report, a nearline document report, or a testing document report.

19. The computer-implemented method of claim 18, further comprising: receiving, by the data access system, a data-specific request;
  parsing, by the data access system, the data-specific request to identify a particular data point included in the particular data;
  determining additional data for the particular data point; and
  transmitting the additional data associated with the particular data point to the client device to cause the client device to update the graphical user interface and display at least the additional data.

20. The computer-implemented method of claim 19, wherein the data-specific request is generated at the client device upon selecting, using a pointer pointing to a particular graph of one or more graphs displayed using the graphical user interface, the particular data point included in the particular graph; and
  wherein upon selecting the particular data point in the particular graph, the particular data point is graphically represented as selected.

* * * * *

UNITED STATES PATENT AND TRADEMARK OFFICE
CERTIFICATE OF CORRECTION

PATENT NO. : 11,238,110 B2
APPLICATION NO. : 16/355336
DATED : February 1, 2022
INVENTOR(S) : David Greetham It is certified that error appears in the above-identified patent and that said Letters Patent is hereby corrected as shown below:

In the Claims

Claim 4, Column 22, Line 27, replace "nave" with --naive--.

Claim 11, Column 24, Line 32, replace "nave" with --naive--.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*